(12) United States Patent
Vikram Singh

(10) Patent No.: US 11,789,634 B2
(45) Date of Patent: Oct. 17, 2023

(54) SYSTEMS AND METHODS FOR PROCESSING COPY COMMANDS

(71) Applicant: SAMSUNG ELECTRONICS CO., LTD., Suwon-si (KR)

(72) Inventor: Fnu Vikram Singh, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 40 days.

(21) Appl. No.: 17/062,467

(22) Filed: Oct. 2, 2020

(65) Prior Publication Data

US 2022/0035530 A1 Feb. 3, 2022

Related U.S. Application Data

(60) Provisional application No. 63/057,726, filed on Jul. 28, 2020.

(51) Int. Cl.
*G06F 3/06* (2006.01)

(52) U.S. Cl.
CPC ............ *G06F 3/065* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 10,452,279 B1 | 10/2019 | Malwankar et al. | |
| 2014/0215129 A1* | 7/2014 | Kuzmin | G06F 12/0246 711/103 |
| 2015/0095554 A1 | 4/2015 | Asnaashar et al. | |
| 2015/0143038 A1 | 5/2015 | Asnaashar et al. | |
| 2015/0261434 A1 | 9/2015 | Kagan et al. | |
| 2016/0026388 A1 | 1/2016 | Jeong et al. | |
| 2017/0052901 A1 | 2/2017 | Seo et al. | |
| 2017/0123721 A1 | 5/2017 | Sela et al. | |
| 2017/0177541 A1 | 6/2017 | Berman et al. | |
| 2017/0192718 A1* | 7/2017 | Tsujimoto | G06F 3/0656 |

(Continued)

OTHER PUBLICATIONS

NVM Express Base Specification, Revision 1.4a, Mar. 9, 2020, 405 pages, https://nvmexpress.org/wp-content/uploads/NVM-Express-1_4a-2020.03.09-Ratified.pdf.

(Continued)

*Primary Examiner* — Michael Alsip

(74) *Attorney, Agent, or Firm* — Lewis Roca Rothgerber Christie LLP

(57) ABSTRACT

Systems and methods for processing copy commands are disclosed. A first controller of the storage device receives a copy command from a host via a first queue. The storage device generates, based on the copy command, a read command and a write command, and submits the read and write commands to a second controller of the storage device via a second queue. The second controller retrieves and processes the read and write commands from the second queue. The storage device reads, based on the processing of the read command, data stored in a first location of a storage media associated with a source address, and writes the data to a second location of the storage media associated with a destination address. The first controller transmits a signal to the host for indicating completion of the copy command.

20 Claims, 17 Drawing Sheets

(56) References Cited

U.S. PATENT DOCUMENTS

| | | |
|---|---|---|
| 2017/0262176 A1 | 9/2017 | Kanno |
| 2018/0069923 A1 | 3/2018 | Tsalmon |
| 2018/0074708 A1 | 3/2018 | Gerhart et al. |
| 2018/0260145 A1 | 9/2018 | Margetts |
| 2018/0284990 A1 | 10/2018 | Kachare et al. |
| 2018/0285024 A1 | 10/2018 | Coleman et al. |
| 2019/0058801 A1 | 2/2019 | Imamura et al. |
| 2019/0095123 A1 | 3/2019 | Lin |
| 2019/0155541 A1 | 5/2019 | Chan et al. |
| 2019/0163364 A1 | 5/2019 | Gibb et al. |
| 2019/0166201 A1 | 5/2019 | Choi et al. |
| 2019/0187928 A1 | 6/2019 | Agarwal |
| 2019/0235785 A1 | 8/2019 | Akers et al. |
| 2019/0278739 A1 | 9/2019 | Tamir et al. |
| 2019/0294369 A1 | 9/2019 | Yun |
| 2019/0377495 A1* | 12/2019 | Kim .................... G06F 3/0683 |
| 2020/0042177 A1 | 2/2020 | Benisty |
| 2020/0050401 A1 | 2/2020 | Gibb et al. |
| 2020/0050505 A1 | 2/2020 | Guo et al. |
| 2020/0081659 A1 | 3/2020 | McGlaughlin et al. |
| 2020/0089648 A1 | 3/2020 | Klein |
| 2020/0104056 A1 | 4/2020 | Benisty et al. |
| 2020/0301857 A1 | 9/2020 | Marks et al. |
| 2021/0303199 A1 | 9/2021 | Horspool et al. |

OTHER PUBLICATIONS

U.S. Office Action dated Dec. 3, 2021, issued in U.S. Appl. No. 17/024,598 (27 pages).

Final Office Action dated Apr. 13, 2022, for related U.S. Appl. No. 17/024,598 (25 pages).

U.S. Advisory Action dated Jun. 29, 2022, issued in U.S. Appl. No. 17/024,598 (3 pages).

EPO Office Action dated Aug. 3, 2022, issued in corresponding European Patent Application No. 21178768.4 (9 pages).

U.S. Office Action dated Oct. 7, 2022, issued in U.S. Appl. No. 17/024,598 (30 pages).

EPO Office Action dated Apr. 11, 2023, issued in corresponding European Patent Application No. 21178768.4 (11 pages).

U.S. Notice of Allowance dated Mar. 30, 2023, issued in U.S. Appl. No. 17/024,598 (15 pages).

* cited by examiner

SYSTEMS AND METHODS FOR PROCESSING COPY COMMANDS

CROSS-REFERENCE TO RELATED APPLICATION(S)

The present application claims priority to and the benefit of U.S. Provisional Application No. 63/057,726, filed Jul. 28, 2020, entitled "METHOD TO PROCESS COPY COMMAND IN NVME SSD," the entire content of which is incorporated herein by reference. This application is also related to U.S. application Ser. No. 17/024,598, filed Sep. 17, 2020, entitled "SYSTEMS AND METHODS FOR PROCESSING COMMANDS FOR STORAGE DEVICES," the content of which is incorporated herein by reference.

FIELD

One or more aspects of embodiments according to the present disclosure relate to storage devices, and more particularly to processing commands that are used for accessing the storage devices.

BACKGROUND

A host computing device may utilize a storage interface protocol to access a non-volatile storage device, such as, for example, a solid state drive (SSD). The non-volatile storage device may include a controller for processing a command that is generated using the protocol. As the protocol grows, more and more features (e.g. commands) may be added to the protocol. A legacy SSD may not be able to process the added features without having to redesign the SSD controller. Thus, it is desirable to have an SSD controller that is capable of processing commands from the host, without having to redesign the SSD controller, even when commands are added to the protocol.

SUMMARY

Embodiments of the present disclosure include a method for processing a copy command from a host to a storage device. A first controller of the storage device receives the copy command from the host via a first queue. The copy command includes a first source address and a first destination address. The storage device generates, based on the copy command, a first read command and a first write command. The storage device submits the first read command and the first write command to a second controller of the storage device via a second queue. The second controller retrieves and processes the first read command and the first write command from the second queue. The storage device reads, based on the processing of the first read command, data stored in a first location of a storage media of the storage device associated with the first source address. The storage device writes, based on the processing of the first write command, the data to a second location of the storage media associated with the first destination address. The first controller transmits a signal to the host for indicating completion of the copy command.

According to one embodiment, the first source address is associated with a first logical space of the storage device identified by a first identifier, and the first destination address is associated with a second logical space of the storage device identified by a second identifier.

According to one embodiment, the copy command includes a second destination address, wherein the writing includes writing a first portion of the data to the second location of the storage media associated with the first destination address, and writing a second portion of the data to a third location of the storage media associated with the second destination address.

According to one embodiment, the data stored in the first location of the storage media includes metadata having a first portion and a second portion, wherein the writing of the data includes: writing the first portion of the metadata to a third location of the storage media associated with the first destination address; generating, by the storage device, a third portion based on the first destination address; and writing, by the storage device, the third portion in the storage media instead of the second portion of the metadata.

According to one embodiment, the method further includes skipping reading of the second portion of the metadata based on the processing of the first read command.

According to one embodiment, the method further includes skipping writing of the second portion of the metadata based on the processing of the first write command.

According to one embodiment, the second portion of the metadata includes data protection information.

According to one embodiment, the first source address is associated with a first logical space configured to store a block of data of a first size, and the first destination address is associated with a second logical space configured to store a block of data of a second size different from the first size.

According to one embodiment, the copy command is associated with a second source address. The method further comprises: generating, by the storage device, based on the copy command, a second read command; submitting, by the storage device, the second read command to the second controller of the storage device via the second queue; retrieving and processing, by the second controller, the second read command from the second queue; and reading, by the storage device, based on the processing of the second read command, data stored in a third location of the storage device associated with the second source address, wherein the processing of the second read command by the second controller is concurrent with the processing of the first write command.

According to one embodiment, the storage device is a non-volatile storage device, and the first controller and the second controller adhere to a non-volatile memory express (NVMe) protocol.

According to one embodiment, the method further comprises submitting, by the second controller, a first completion status to a first completion queue.

According to one embodiment, the transmitting of the signal includes submitting a second completion status to a second completion queue based on the submitting of the first completion status to the first completion queue.

Embodiments of the present disclosure also include a storage device comprising a storage media and one or more processors coupled to the storage media. The one or more processors are configured to respectively: receive, via a first controller and a first queue, a copy command from a host, wherein the copy command includes a first source address and a first destination address; generate, based on the copy command, a first read command and a first write command; submit the first read command and the first write command to a second controller via a second queue; retrieve and process, via the second controller, the first read command and the first write command from the second queue; read, based on the processing of the first read command, data stored in a first location of the storage media associated with the first source address; write, based on the processing of the first write command, the data to a second location of the storage media associated with the first destination address; and transmit, via the first controller, a signal to the host for indicating completion of the copy command.

As a person of skill in the art should recognize, embodiments of the present disclosure allow the processing of commands and/or extensions by a legacy storage device. The command may be a copy command between two addresses in a same namespace having a same logical block address (LBA) format, and/or between addresses in two namespaces having different LBA formats/sizes with multiple destination ranges. The separating of the copy command into internal read and write commands that may be processed concurrently, may lead to better performance of the storage device, and/or reduction in processing overhead.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
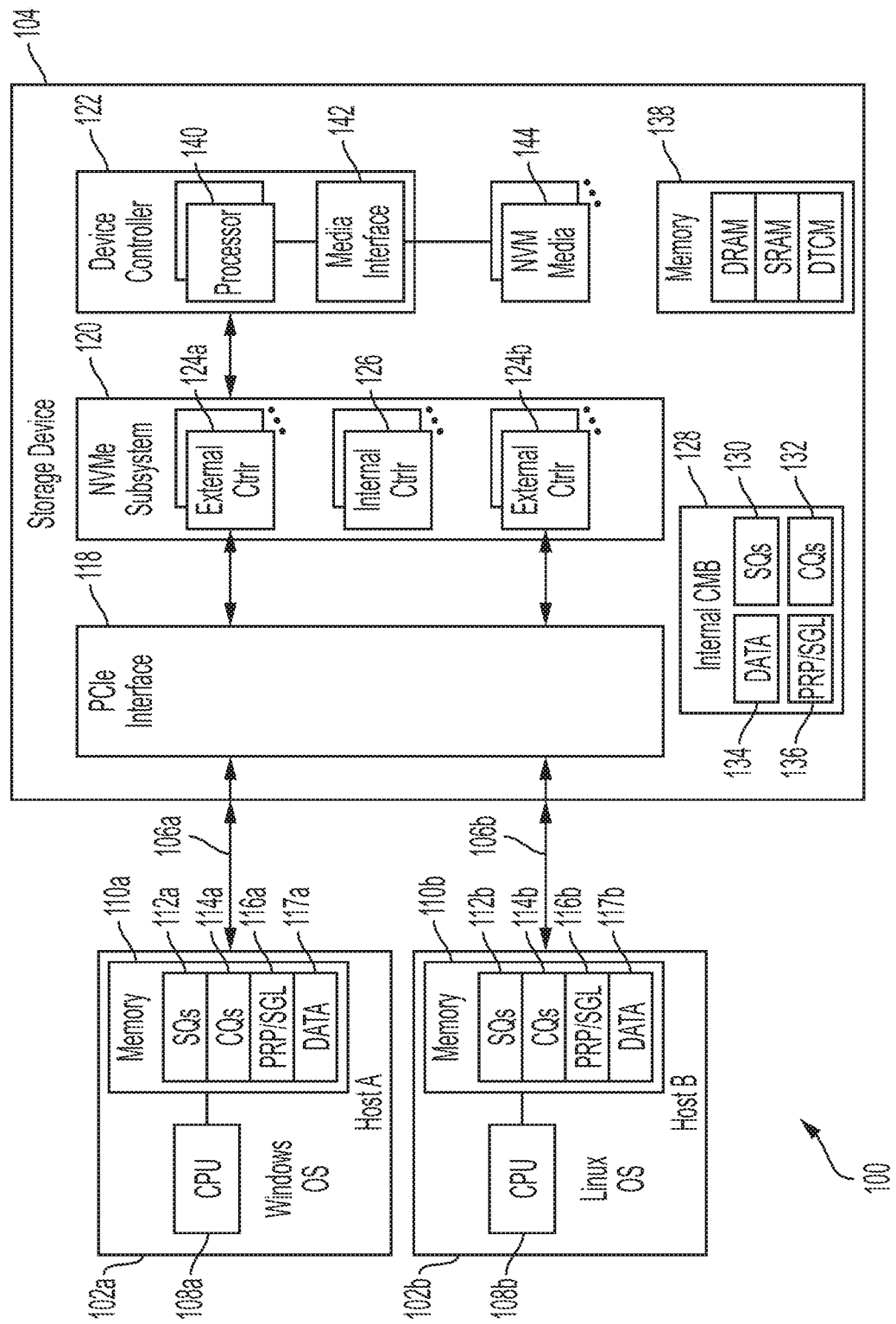
FIG. 1 is a block diagram of a data storage and retrieval system according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A host computing device may utilize a communication protocol to access a non-volatile storage device, such as, for example, a solid state drive (SSD). The non-volatile storage device may include a controller for processing a command that is generated using the protocol. As the protocol grows, more and more features (e.g. commands) may be added to the protocol. A legacy SSD may not be able to process the added features without having to redesign the SSD controller. Thus, it is desirable to have an SSD controller that is capable of processing commands from the host, without having to redesign the SSD controller, even when commands are added to the protocol.

In general terms, embodiments of the present disclosure are directed to a storage device configured to process a command from a host, that adheres to a communication protocol. The communication protocol may be, for example, a non-volatile memory express (NVMe) protocol, although embodiments of the present disclosure are not limited thereto, and may extend to other protocols as will be appreciated by a person of skill in the art.

In one embodiment, the command from the host is decomposed into one or more internal commands for executing by the storage device. The storage device may include an internal controller configured to fetch and execute the one or more internal commands. In one embodiment, no communication path is set up between the host and the internal controller. Thus, the internal controller is not exposed to the host.

In one embodiment, the host submits the host command to an external submission queue exposed to the host, and associated with the storage device, using an interface such as, for example, an NVMe Interface. An external controller of the storage device may fetch/obtain the host command, and pass the fetched command to the storage device's processor for generating internal commands. The internal commands may be submitted to one or more internal submission queues. In one embodiment, the internal submission queues and the internal controller are unexposed (e.g. hidden) to the host.

The internal controller may fetch/obtain the internal commands, and dispatch them for execution by the processor as standard commands adhering to the communication protocol (e.g. NVMe protocol), or vendor specific commands, as if the commands were originating from the host. In one embodiment, the internal commands are fetched/obtained and executed concurrently with one another (e.g. in parallel) by the storage device. The terms concurrently and in parallel may mean at substantially the same time, at a rate that is faster than sequential processing, and/or the like.

FIG. 1 is a block diagram of a data storage and retrieval system 100 according to one embodiment. The system includes one or more host devices 102a-102b (collectively referenced as 102), configured with the same or different operating systems. The one or more host device 102 may be coupled to a data storage device 104 over a storage interface bus 106a, 106b (collectively referenced as 106). The storage interface bus 106 may be, for example, a Peripheral Component Interconnect Express (PCIe) bus. In one embodiment, the host devices 102 transfer and receive data from the data storage device 104 over the storage interface bus 106, using a storage interface protocol. The storage interface protocol may be the NVMe protocol as described in the Mar. 9, 2020, NVM Express base specification revision 1.4a (or prior or future revisions) available at http://nvmexpress.org, the content of which is incorporated herein by reference. The NVMe protocol is used as an example for purposes of describing the present embodiments. A person of skill in the art should understand, however, that the various embodiments will extend to other current or future storage interface protocols similar to the NVMe protocol, without departing from the spirit and scope of the inventive concept.

The host 102 may be a computing device having a processor 108a,108b (collectively referenced as 108) that is configured to process data. The processor 108 may be a general purpose central processing unit (CPU), application specific integrated circuit (ASIC), field programmable gate array (FPGA), or any other form of processing unit configured with software instructions, microcode, and/or firmware.

In one embodiment, the processor 108 is coupled to a host memory space 110a, 110b (collectively referenced as 110). The host memory space 110 may be a static random access memory (SRAM), dynamic random access memory (DRAM), and/or the like. An application program may be stored in the host memory space 110 for executing by the processor 108. The application may request storage or retrieval of data to and from the storage device 104. The application may generate an output based on the storing or retrieval of data. The output may be, for example, displaying retrieved data on a display device. In one embodiment, the use of internal commands by the storage device to process requests from the application allow the requests to be processed faster and with less overhead.

The host memory space 110 may also store one or more external submission queues (SQs) 112a, 112b (collectively referenced as 112), and one or more external completion queues (CQs) 114a, 114b (collectively referenced as 114). The host 102 may use the external submission queues 112 to submit storage interface commands for execution by the storage device 104, and use the external completion queues 114 to receive completion messages from the storage device 104 after the commands have been executed. In some embodiments, the external submission and completion queues 112, 114 are included in a controller memory buffer (CMB) of the storage device 104 instead of (or in addition to) the host memory space 110. Thus, a reference to the host memory space 110 may be understood to include a reference to the CMB. In either scenario, the external submission and completion queues 112, 114 are exposed to, and accessible by, the host.

In one embodiment, the host memory space 110 stores Physical Region Page (PRP)/Scatter Gather List (SGL) entries 116a, 116b (collectively referenced as 116) and other data 117a, 117b (collectively referenced as 117). For example, the PRP/SGL entries 116 may describe physical memory locations of the host memory space 110, for writing data read from the storage device 104 for an NVMe read command, and for reading data to be written to the storage device 104 for an NVMe write command. For certain storage interface commands, logical block address (LBA) ranges may be stored as data 117 in the host memory space, instead of including the ranges in the command itself. An example of such a command is a dataset management deallocate command, which may be used to deallocate/unmap the LBA ranges provided by the host.

The storage device 104 may be a non-volatile storage device such as, for example, a solid state drive (SSD). The storage device 104 may include a communications interface 118, NVMe subsystem 120, and device controller 122. Although the NVMe subsystem 120 and device controller 122 are depicted as separate modules, it should be understood that the functionality of the NVMe subsystem and the device controller 122 may also be incorporated as a single module. In one embodiment, the communications interface 118 includes PCIe ports and endpoints that enable ingress communications from the host 102 to the storage device 104, and egress of communications from the storage device 104 to the host 102.

The NVMe subsystem 120 may include, without limitation, one or more external controllers 124, 124b (collectively referenced as 124) and one or more internal controllers 126. The external and internal controllers 124, 126 may be implemented via one or more processors such as, for example, an application-specific integrated circuit (ASIC). In one embodiment, the one or more external controllers 124 are exposed to the host via the PCIe interface 118, and are invoked for handling queue operations of the external submission and completion queues 112, 114. For example, a particular external controller 124 may fetch a storage interface command in a particular external submission queue 112, and place a completion status in the corresponding external completion queue 114 based on status of the requested command (e.g. indication that the requested command has been completed).

In one embodiment, a particular external controller 124 is associated with one or more of the namespaces. In this regard, the logical space of the storage device 104 may be split into the one or more logical spaces/namespaces, each namespace being identified by a unique namespace ID (NSID). For example, assuming a 1 TB storage device that uses 4K logical blocks, three namespaces may be allocated with the following capacity: 512 GB, 256 GB, and 256 GB. A command submitted by the host 102 may be directed to a specific namespace that is identified via the NSID.

In one embodiment, the one or more internal controllers 126 are unexposed to (e.g. hidden), and inaccessible by, the host 102. In this regard, no communication interface (e.g. PCIe interface) is provided between the host 102 and the internal controllers 126. The internal controller 126 may, according to one embodiment, mimic the functionality of the external controller 124. In this regard, the internal controller may interact with the device controller 122 as if it were an external controller 124.

In one embodiment, the storage device 104 includes an internal CMB 128 storing one or more internal submission queues 130, and one or more internal completion queues 132. The CMB 128 may store other data 134 (e.g. internal data buffers) and internal PRP/SGL entries 136. In one embodiment, the internal controller 126 accesses the internal CMB 128 for fetching and processing internal commands submitted by the device controller 126. The contents of the internal CMB 128, and the processing of the internal command, may be unexposed to (e.g. hidden), and inaccessible by, the host.

In one embodiment, the device controller 122 interacts with the external and internal controllers 124, 126 for executing commands requested by the host 102. The device controller 122 may include, without limitation, one or more processors 140 and media interface(s) 142. The one or more processors 140 may be configured to execute computer-readable instructions for processing commands to and from the external and internal controllers 124, 126, and for managing operations of the storage device 104. The computer-readable instructions executed by the one or more processors 140 may be, for example, firmware code.

In one example, the one or more processors 140 may be configured to interact with the external and internal controllers 124, 126 for receiving write or read commands to or from NVM media 144. The one or more processors 140 may interact with the NVM media 144 over the media interface 142 for effectuating the write or read actions. The NVM media 144 may include one or more types of non-volatile memory such as, for example, flash memory.

In one embodiment, the storage device 104 further includes an internal memory 138 for short-term storage or temporary memory during operation of the storage device 104. The internal memory 138 may include a DRAM (dynamic random access memory), SRAM (static random access memory), and/or DTCM (Data Tightly Coupled Memory). The internal memory 138 may be used in lieu or in addition to the internal CMB 128, to store some or all of the data stored in the internal CMB 128, such as, for example, the internal submission queues 130, completion queues 132, data 134, PRP/SGL entries 136, and/or the like. Thus, a reference to the internal CMB 128 may be understood to include a reference to the internal memory 138.

Figure 2:
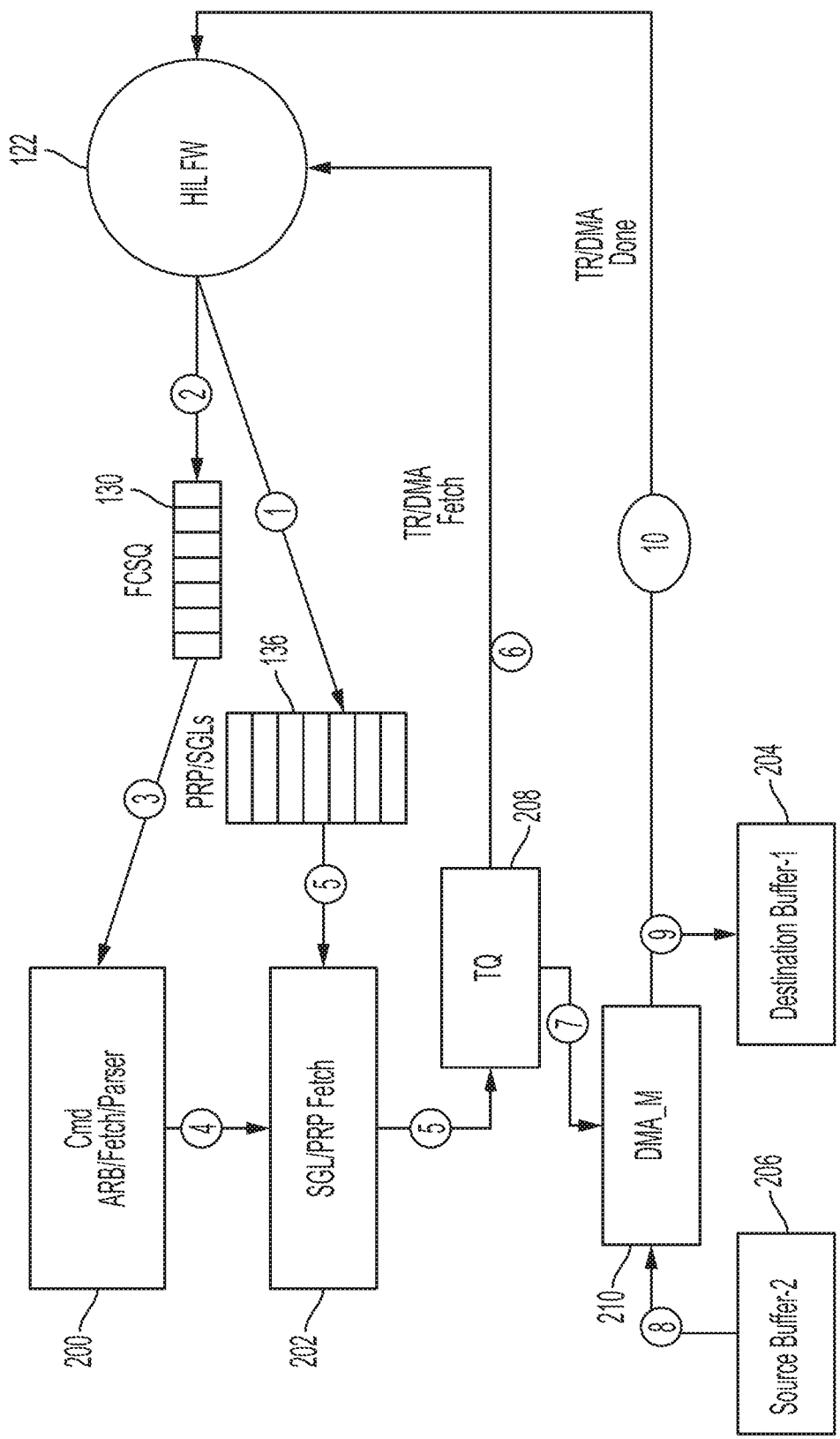
FIG. 2 is a conceptual layout diagram of various modules for submitting and processing storage interface commands according to one embodiment.

FIG. 2 is a conceptual layout diagram of various modules for submitting and processing commands associated with a storage interface protocol, or vendor defined commands, according to one embodiment. The various modules may be hosted by the external and/or internal controllers 124, 126. Also, although one or more of the modules are assumed to be separate functional units, a person of skill in the art will recognize that the functionality of the modules may be combined or integrated into a single module, or further subdivided into further sub-modules without departing from the spirit and scope of the inventive concept.

In one embodiment, instances of a command module 200 and PRP/SGL fetch module 202 are included in both the external and internal controllers 124, 126. The command module 200 may include, for example, a command arbitration submodule, a command fetch submodule, a command parser submodule, and a command dispatcher submodule. The command fetch submodule may be configured to fetch a host command from the external submission queue 112, or an internal command from the internal submission queue 130. The command arbitration submodule may be configured to invoke an arbitration burst policy to arbitrate between various controllers, and between various submission queues of selected controllers, to pick a submission queue from which to fetch a command. The command parser submodule may be configured to parse a command submitted to the external or internal controller, for checking and verifying command format, NSID validity, reservation status, whether LBA checking is required or not, protection information validity based on the namespace format, and/or the like. The command parser submodule may also be configured to interface with an LBA overlap checker (not shown) to pass the command if LBA overlap checking is necessary for the command, based on programmed configuration information. The command parser submodule may also determine whether a command should be directly sent to the media interface, by-passing the host subsystem, for increasing system performance. The LBA overlap checker may be responsible for checking whether a host or internal command is currently being processed for the same range as with a newly arrived command. If the answer is yes, the LBA overlap checker may hold the newly arrived command until the previously fetched, and currently under-process command, completes. The command dispatcher hardware submodule may be responsible for distributing the commands to various processors based on the type of command (e.g. performance, non-performance, or administrative).

The SGL/PRP fetch module 202 may be configured to fetch PRP or SLG entries 116 from the host memory (in case of the external controller 124), or fetch PRP or SGL entries 136 from the internal CMB 128 (in case of the internal controller 126). In one embodiment, both the command module 200 and the SGL/PRP fetch module 202 adhere to the storage interface protocol in fetching commands and PRP/SGL entries, respectively.

In one embodiment, the host 102 submits a storage interface command to one of the external submission queues 112. The command module 200 (e.g. command fetch submodule) of one of the external controllers 124 fetches/obtains the command from the external submission queue 112, and passes the command to the device controller 122 for further processing. Depending on the type of command submitted by the host, the device controller 122 may access the host memory 110 for reading data 117 needed to process the fetched command, such as, for example, LBA ranges. In one embodiment, if the command submitted by the host 102 is a data transfer command, the SGL/PRP fetch module 202 associated with the external controller 124 may fetch the SGL/PRP entries 116 from the host memory 110 or CMB, for reading or writing the data associated with the data transfer command.

In one embodiment, the device controller 122 is configured to generate one or more internal commands based on the fetched command. The one or more internal commands may include a portion of the fetched command (e.g. an operation code in the fetched command). In one embodiment, the one or more internal commands are different from the fetched command. For example, the internal command may have an operation code different from the operation code in the fetched command.

The device controller 122 may submit the one or more internal commands to the internal submission queue 130, similar to the manner in which the host 102 submits NVMe commands to the external submission queue 112. For example, the device controller 122 may inform the command module 200 of the internal controller 126 that the one or more internal commands have been submitted, by updating a hardware doorbell register. In some cases, the command submitted by the host 102 may be broken into multiple internal commands. In one embodiment, the multiple internal commands are submitted and processed in concurrently with one another (e.g. in parallel) by the one or more internal controllers 126, allowing for increased performance of the storage device 104.

In one embodiment, if the internal command requires a data transfer, the SGL/PRP fetch module 202 of the internal controller 126 may fetch internal SGL/PRP entries 136 from the internal CMB 128, for reading or writing data associated with the internal command. The internal SGL/PRP entries 136 may be generated by the device controller 122. In one embodiment, for a read operation requiring a transfer from the NVM media 144, the internal SGL/PRP entries 136 may be for a destination buffer 204. For a write operation requiring a transfer to the NVM media 144, the internal SGL/PRP entries 136 may be for a source buffer 206.

In one embodiment, a transfer queue module 208 may be configured to process internal requests for transfer data to/from an intermediary buffer (not shown) based on a command type (e.g. read or write). For example, for internal read or write operations, the transfer queue module 208 may obtain information from the device controller 122 on certain data structures for controlling the direct memory access, including a transfer descriptor (TR) and a direct memory access (DMA) descriptor. The TR descriptor may contain a command type (e.g. read or write) for the data transfer. The DMA descriptor may contain information on the intermediary buffer for the command type. For example, if the certain command type is an internal read command, the intermediary buffer may be an intermediary read buffer used by the media interface 142 to temporarily hold data read from the NVM media 144. If the command type is an internal write command, the intermediary buffer may be an intermediary write buffer used by the media interface 142 to temporarily hold data to be written to the NVM media 144.

In one embodiment, a DMA manager module 210 receives the DMA descriptor as well as the SGL/PRP entries 136, and transfers data from the source buffer 206 to the NVM media 144 (via the intermediary buffer provided in the DMA descriptor) for an internal write operation, or from the NVM media (via the intermediary buffer provided in the DMA descriptor) to the destination buffer 204 for an internal read operation.

Figure 3:
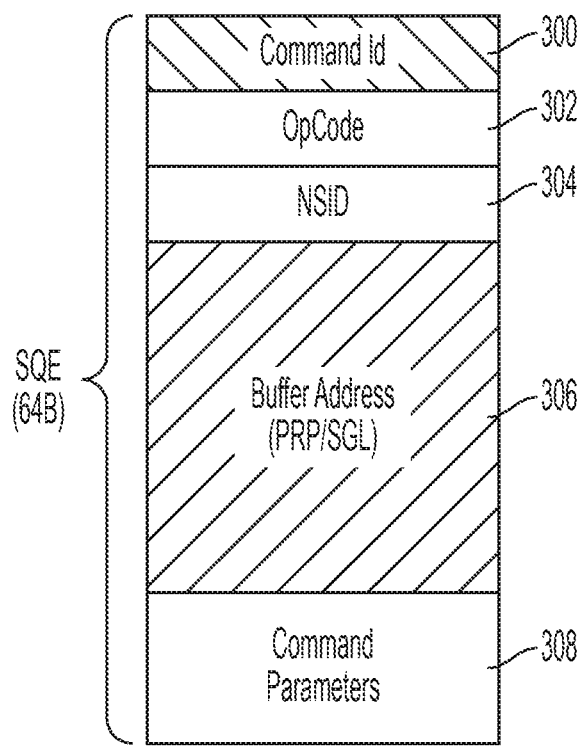
FIG. 3 is a layout block diagram of an internal command stored as a submission queue entry (SQE) in an internal submission queue according to one embodiment.

FIG. 3 is a layout block diagram of an internal command stored as a submission queue entry (SQE) in the internal submission queue 130 according to one embodiment. In one embodiment, the internal command is generated according to the storage interface protocol for generating external commands In this regard, the internal command may be 64 bytes in size, and may include a command identifier (ID) 300, operation code (OpCode) 302, namespace ID, buffer address 306, and command parameters 308. The command ID 300 may be a command ID within the internal submission queue 130 to which the internal command is submitted.

The OpCode 302 may identify a particular command that is to be executed. In one embodiment, the OpCode is an NVMe OpCode identifying an NVM command (e.g. write, read, administrative, dataset management, or vendor specific command). In some embodiments, the OpCode identifies a new command in an internal command set that is accessible to the internal controller 126 alone.

The namespace ID 304 may identify a namespace on which the command identified by the OPCode 302 operates. The buffer address 306 may include internal PRP/SGL entries 136 (or pointers to the PRP/SGL entries) in the internal CMB 128. Any parameter associated with the command to be executed may be stored as a command parameter 308.

Figure 4:
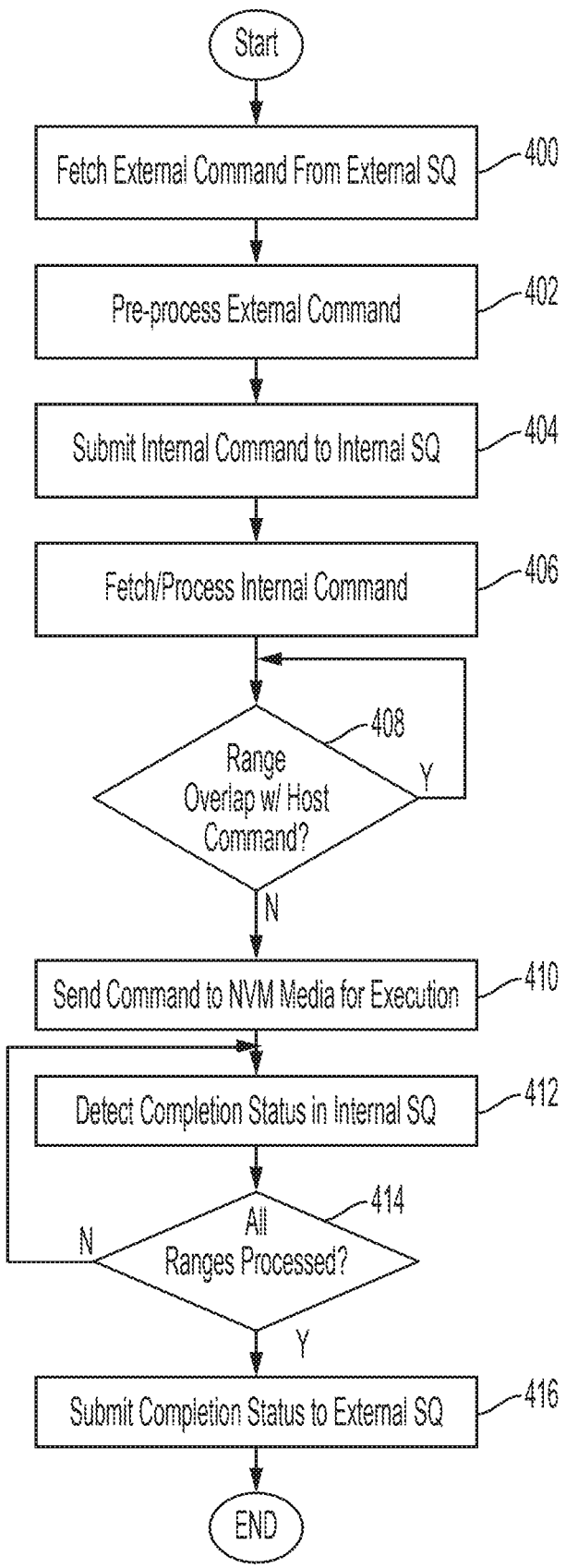
FIG. 4 is a flow diagram for processing a dataset management (DSM) command for deallocating (unmapping) a given set of logical block address ranges from a given namespace according to one embodiment.

FIG. 4 is a flow diagram for processing a dataset management (DSM) command submitted by the host 102 to the external submission queue 112, for deallocating (unmapping) a given set of LBA ranges from a given namespace according to one embodiment. The process starts, and in block 400, one of the external controllers 124 fetches the command from the external submission queue 112, and passes it to the device controller 122 for pre-processing by the processor 140.

In block 402, the processor 140 takes certain pre-processing actions including, for example, starting a host direct memory access operation over the storage interface bus 106, to transfer the LBA ranges from the host memory 110, to the storage device's internal memory 138. In addition, the processor 140 may parse the LBA ranges for identifying a total number of non-contiguous LBA ranges.

In block 404, the processor 140 generates an internal unmap command for each non-contiguous LBA range identified by the processor. In one embodiment, the unmap command is a command that is not part of the storage interface protocol. The processor 140 may submit the internal unmap command(s) to one or more of the internal submission queues 130.

The unmap command submitted for each LBA range is processed in blocks 406-412. Although the processing is described in relation to one unmap command for a single LBA range, it should be appreciated that other unmap commands submitted for other LBA ranges may be also be processed in parallel according to blocks 406-412.

In block 406, the internal controller 126 fetches and processes the unmap command from the internal submission queue 130. The command module 200 of the internal controller 126 may be invoked for fetching the unmap command from the internal submission queue 130. In one embodiment, given that the processing of the unmap command does not require a data transfer, the SGL/PRP fetch module 202 of the internal controller 126 is not invoked, and no internal PRP/SGL lists 136 are created.

In block 408, the internal controller 126 (e.g. LBA overlap checker) determines whether the LBA range in the internal unmap command overlaps with an LBA of a command that is being processed on behalf of the host 126. For example, the LBA range of the unmap command may overlap with an LBA address that is currently subject of a read operation by the host 126. If an overlap is detected, the internal controller 126 may wait until the host command is finished before proceeding with the unmapping of the LBA range.

If, however, no overlap is detected, the internal controller 126 transmits, in block 410, one or more commands to the media interface 142 via the device controller 122, for executing the actual unmap operation of the LBA range on the NVM media. It should be understood that the command parser submodule may also be invoked for performing other checks and verifications of the unmap command prior to delivering the one or more commands to the media interface 142, such as, for example, checking and verifying command format, NSID validity, reservation status, whether LBA checking is required or not, protection information validity based on the namespace format, and/or the like.

Upon determining a completion status of the unmap operation, the internal controller 126 submits, in block 412, an internal completion entry to the internal completion queue 132 associated with the internal submission queue 130 where the internal unmap command was submitted.

In block 414, the processor 140 determines whether all LBA ranges of the submitted DSM deallocate command have been deallocated (e.g. based on status of the internal unmap commands). If the answer is YES, the external controller 124 submits, in block 416, an external completion entry to the external completion queue 114 corresponding to the external submission queue 112 to which the DSM deallocate command was submitted.

It should be appreciated that the processing of the DSM deallocate command according to an embodiment of the present disclosure provides technical improvements to the functioning of the data storage device 104. For example, parallel processing of LBA ranges due to the splitting of the DSM deallocate command into independent unmap commands, each with a separate LBA range, allows for better performance of the storage device. In addition, the checking of each LBA range for overlap (e.g. via hardware) reduces overhead of the processor 140, as manual locking and unlocking of the ranges may be avoided. In addition, in embodiments where the storage device includes two subsystems (e.g. a host subsystem for interacting with the hosts 102, and a flash subsystem for interacting with the NVM media 144), with dedicated processors (e.g. processor 140) executing firmware, the overhead of the host subsystem (e.g. firmware running on the processor 140) may be reduced, as the internal commands may be processed without much involvement of the host subsystem.

Processing Copy Commands

In one embodiment, the command submitted by the host 102 is a copy command (e.g. an NVMe Copy command or Vendor Unique Copy Command) for copying data from one or more source addresses, to one or more destination addresses, of the NVM media 144. The source and destination addresses may be provided as source and destination LBA ranges. In one embodiment, an LBA range includes a starting LBA, and a number of logical blocks in the range.

In one embodiment, the requested copy action may be from a single source LBA range to a single or multiple destination LBA ranges, or from multiple source LBA ranges to a single or multiple destination LBA ranges. The destination LBA range(s) may be in the same or different namespace as the source LBA ranges, and/or have the same or different formatted LBA sizes (e.g. logical block sizes). In some embodiments, the logical blocks may have end-to-end protection information (PI) specified for error detection.

Figure 5:
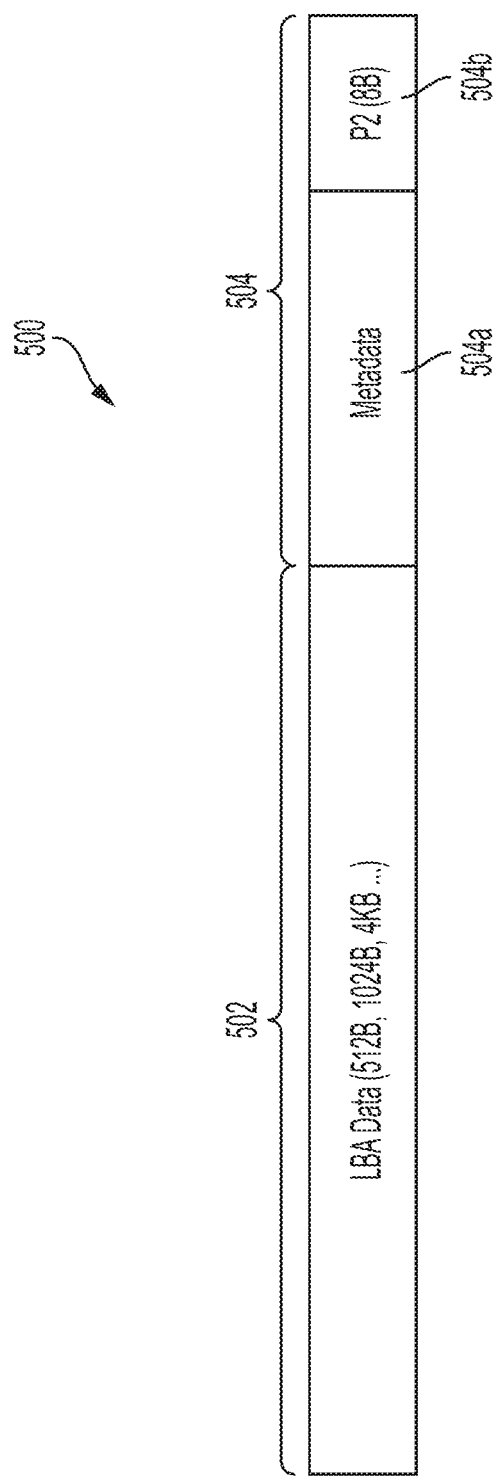
FIG. 5 is a conceptual block diagram of a format of a logical address block, according to one embodiment.

FIG. 5 is a conceptual block diagram of a format of a logical block 500 according to one embodiment. A logical block may include a data portion 502 and an optional metadata portion 504. The data portion 502 may have one of different sizes, such as, for example, 512B, 1024B, 4096B, or the like. A logical block with different data sizes may be described as having different LBA formats.

The metadata portion 504 may be, for example, 16B, and may be used to convey metadata information 504a, including, for example, end-to-end protection information (PI) 504b. The end-to-end protection information may be used by the controller 124 and/or host 102, to determine the integrity of the logical block. If present, the PI 504b portion may occupy the first eight bytes of the metadata portion 504, or the last eight bytes, depending on the format of the namespace. The remaining portion of the metadata (which may be referred to as user data) may also be eight or more bytes. In some cases, the entire metadata portion 504 just contain PI information 504b or metadata information 504a.

Figure 6A:
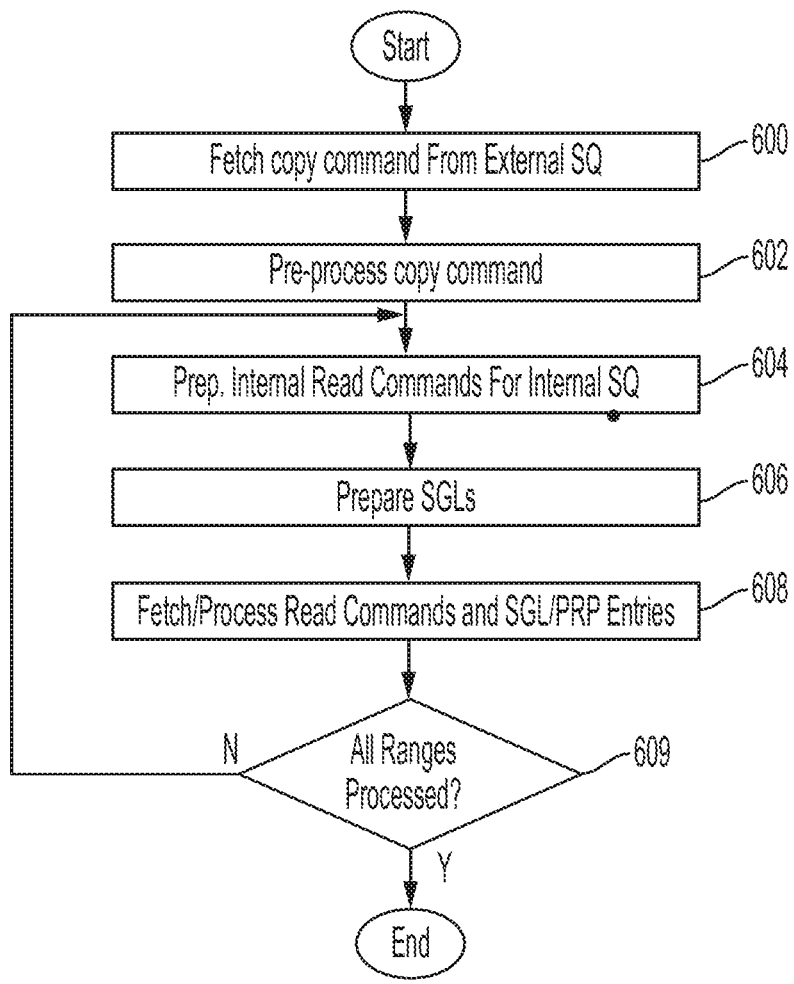
FIGS. 6A and 6B are flow diagrams for processing a copy command submitted by a host to an external submission queue, according to one embodiment.
Figure 6B:
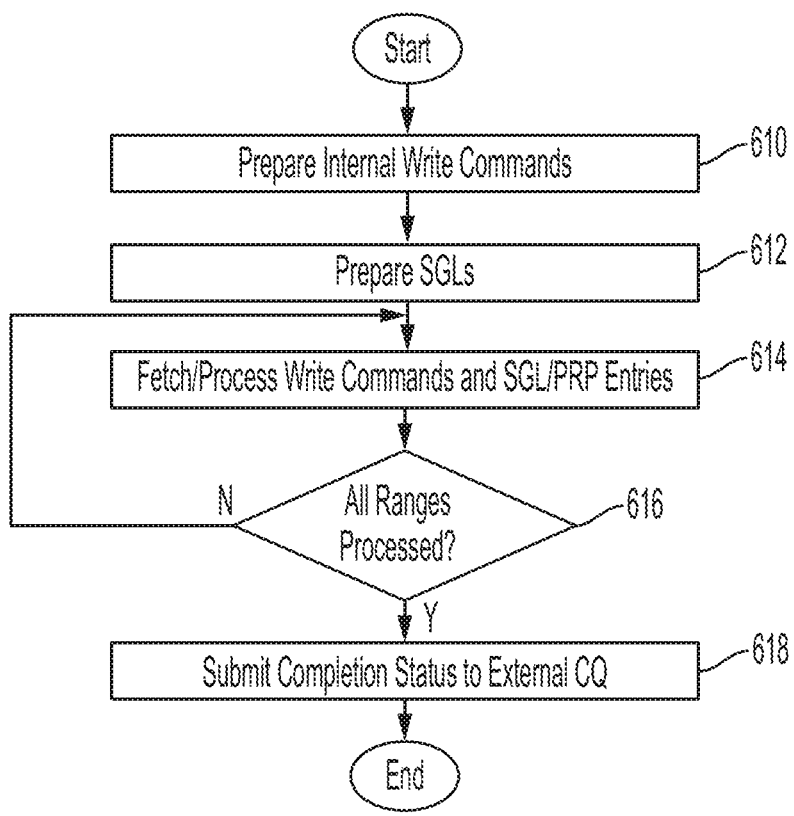

FIGS. 6A-6B are flow diagrams for processing a copy command (e.g. NVMe Copy command or Vendor Unique Copy Command) submitted by the host 102 to the external submission queue 112, according to one embodiment. Although an NVMe Copy command or Vendor Unique Copy Command is used as an example, it should be understood that the flow diagram may also apply to other copy commands submitted using other protocols similar to the NVMe protocol. It should also be understood that the sequence of steps of the process is not fixed, but can be altered into any desired sequence as recognized by a person of skill in the art. In addition, two or more of the steps of the process may be executed in series or concurrently with each other.

The process starts, and at block 600, one of the external controllers 124 fetches the submitted copy command from the external submission queue 112, and passes it to the device controller 122 for pre-processing by the processor 140.

The pre-processing actions taken by the processor 140, at block 602, may include starting a host direct memory access operation over the storage interface bus 106, to transfer source and destination LBA ranges from the host memory 110, to the storage device's internal memory 138. In addition, the processor 140 may parse the LBA ranges for merging any ranges that are contiguous. The one or more source and destination LBA ranges may be in a different namespace, and/or have different LBA formats. Different NSID for different source and destination namespaces may be passed via the 64B itself, for example, when using an NVMe Vendor Unique Copy command. An NVMe Copy command, however, may not include different namespace information as it may not be supported by the NVMe protocol.

In one embodiment, the processor 140 decomposes the copy command into independent read and write commands that may be processed by the internal controller 126 without knowledge by the host. In this regard, at block 604, the processor 140 prepares an internal read command for a non-contiguous source LBA range identified by the processor, for submitting to one or more of the internal submission queues 130.

At block 606, the processor 140 prepares one or more SGL/PRP entries 136 describing the internal source buffer 206 from where the data is to be read. Assuming that SGL entries are used, a particular SGL entry may include an SGL data block descriptor. The SGL data block descriptor may include an address and a length of a block of data to be read.

At block 608, the internal controller 126 fetches and processes the read command from the internal submission queue 130. The command module 200 of the internal controller 126 may be invoked for fetching and processing the read command. In this regard, the command module 200 may interact with the processor 140 to execute a read transfer from the NVM media 144 to an intermediate read buffer hosted, for example, in the internal memory 138 of the storage device 104. In some embodiments, the internal controller 126 may process the read command based on submitting the command to the internal submission queue 130, without intervention from processor 140, in order to help improve performance of the storage device. In such embodiments, intermediate buffers may be allocated by the device controller 122 without intervention by the processor 140.

In addition to the fetching of the read command, the SGL/PRP fetch module 202 may also be invoked for fetching the SGL/PRP entries 136 generated by the processor 140.

In processing the read command, the transfer queue module 208 may be invoked to obtain information of the intermediary read buffer storing the read data. Based on this information, the DMA manager module 210 transfers the data in the intermediary read buffer, to the internal source buffer 206 described by the SLG/PRP entries 136, and notifies the processor 140 when the transfer is complete.

In one embodiment, the data in the source buffer 206 is processed for copying to a destination LBA range provided by the host in the copy command (e.g. NVMe copy or Vendor Unique Copy command). In this regard, the DMA manager module 210 may transfer the data in the internal source buffer 206, to the internal destination buffer 204, in preparation of an internal write command for performing the copy. In some embodiments, the processor 140 supplies the address of the internal source buffer 206 where the data was copied via the internal read command, for being used as the buffer for processing the internal write command. This may help avoid overhead associated in transferring the data from the internal source buffer 206 to the internal destination buffer 204.

In block 609, a determination is made as to whether all LBA ranges have been processed for generating a read command. If the answer is NO, the processor returns to block 604 to prepare an internal read command for another non-contiguous source LBA range identified by the processor. For example, assuming that the processor identifies 100 non-contiguous LBA ranges to be read, the processor may generate 100 separate read commands, with each read command including a different source LBA range as part of the command.

Data that is read via the internal read command may then be written via an internal write command. In this regard, in block 610, the processor 140 prepares the internal write command for submitting to one or more of the internal submission queues 130. In one embodiment, the internal write command includes one of the destination LBA ranges in the copy command (e.g. NVMe copy or Vendor Unique Copy command) submitted by the host.

At block 612, the processor prepares SGL/PRP entries 136 describing the internal destination buffer 204 (or the internal source buffer 206 if supplied by the processor) containing the data that is to be written into the NVM media 144. In an embodiment where SGL entries are used, an SGL entry may include an SGL data block descriptor including an address and length of a block of data that is to be read. In some embodiments, the SGL entry may include an SGL bit bucket descriptor including a length of data that is to be skipped when writing to the intermediary write buffer. In one embodiment, the SGL bit bucket descriptor is used to skip writing a PI portion of the data in instances where formatting/type of PI of the source namespace differs from the formatting/type of PI of the destination namespace. Although PI is used as an example of a portion of data that may be skipped, the disclosure is not limited thereto, and other portions of the data may also be skipped for other types of commands.

At block 614, the internal controller 126 fetches and processes the write command from the internal submission queue 130. The command module 200 of the internal controller 126 may be invoked for fetching and processing the write command. In this regard, the command module 200 may interact with the processor 140 to execute a write transfer from the internal destination buffer 204 to an intermediate write buffer hosted, for example, in the internal memory 138 of the storage device 104.

In addition to the fetching of the write command, the SGL/PRP fetch module 202 may also be invoked for fetching the SGL/PRP entries 136 generated by the processor 140.

In processing the write command, the transfer queue module 208 may be invoked for obtain information of the intermediary write buffer to where the data is to be transferred. Based on this information, the DMA manager module 210 transfers the data in the internal destination buffer 204 (or the internal source buffer 206 if supplied by the processor) described by the SLG/PRP entries 136, to the intermediary write buffer, and notifies the processor 140 when the transfer is complete.

In one embodiment, the separate read and/or write commands are submitted to the one or more internal submission queues 130 for being processed concurrently. For example, a first write command for an LBA range may be processed via the steps of FIG. 6B after a first read command for the LBA range has been executed via the steps of FIG. 6A, without waiting for the read commands for all LBA ranges to be completed. Similarly, a second read command for a second LBA range may be processed concurrently with the processing of the first write command. The submitting of the internal read commands to the internal submission queues 130 may be undetected by the host 102.

At block 616, a determination is made as to whether all the LBA ranges have been copied. If the answer is YES, the external controller 124 submits, in block 618, an external completion entry to the external completion queue 114 corresponding to the external submission queue 112 to which the copy command was submitted.

Figure 7:
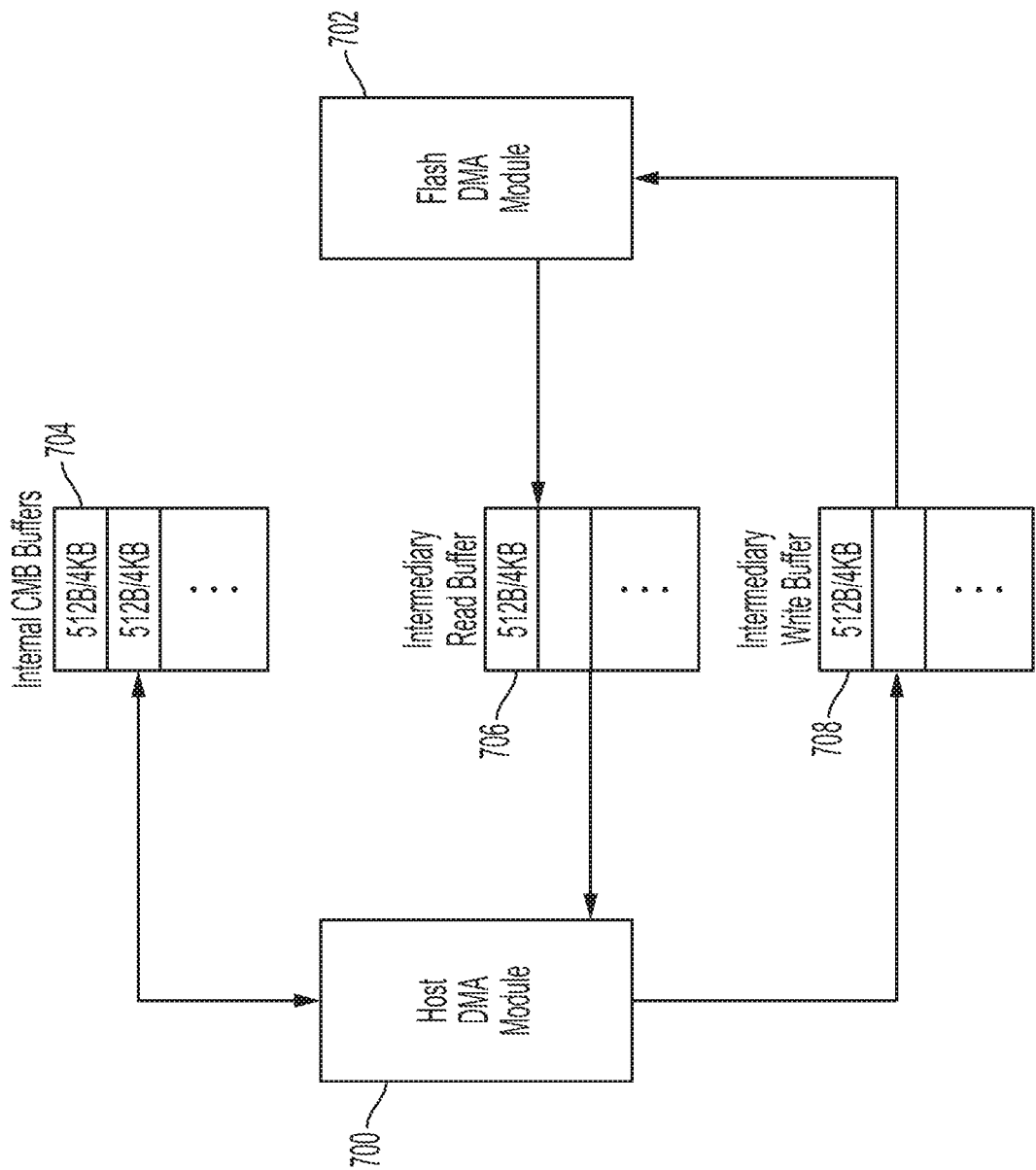
FIG. 7 is a more detailed block diagram of components of the storage device for processing internal read and write commands associated with a copy command, according to one embodiment.

FIG. 7 is a more detailed block diagram of components of the storage device 104 for processing internal read and write commands associated with a copy command, according to one embodiment. The components may include a host DMA module 700, flash DMA module 702, internal CMB buffers 704, intermediary read buffer 706, and intermediary write buffer 708.

In executing an internal read command, the processor 140 submits a read request to the flash DMA module 700 for reading a logical block of data from the NVM media 144 corresponding to a source LBA address of the copy command. In one example, the flash DMA module 700 may be part of the media interface 142. The size of the data that is accessed by the flash DMA module may depend on the LBA format used by the namespace from where data is read, and may also depend on available intermediate data buffer size. A request to the flash DMA module 702 may be in terms of intermediate buffer granularity, which may be 512B, 4 KB, 8 KB or 16 KB. For example, depending on the LBA format and required copy data length, 512B, 4 KB, 8 KB or 16 KB of data may be accessed at a time.

In one embodiment, the block of data retrieved from the NVM media 144 is placed in the intermediary read buffer 706. The intermediary read buffer 706 may be located, for example, in the internal memory 138 of the storage device. In one embodiment, the data in the intermediary read buffer 706 is accessed by the host DMA module 700, and placed in one of the internal CMB buffers 704. In this regard, the host DMA module 700 may be similar to the DMA manager module 210, and the one of the internal CMB buffers 704 where the data is placed, may be similar to the internal source buffer 206.

In executing the internal write command, the host DMA module 700 places the data in one of the internal CMB buffers 704 (e.g. the internal destination buffer 204) into the intermediary write buffer 708. The intermediary write buffer 706 may be located, for example, in the internal memory 138 of the storage device. In one embodiment, data is written to the intermediary write buffer 708 according to the LBA format of the namespace associated with the destination LBA. The flash DMA module 702 may access the data in the intermediary write buffer 708, and write the data to a location of the NVM media 144 corresponding to the destination LBA.

Figure 8A:
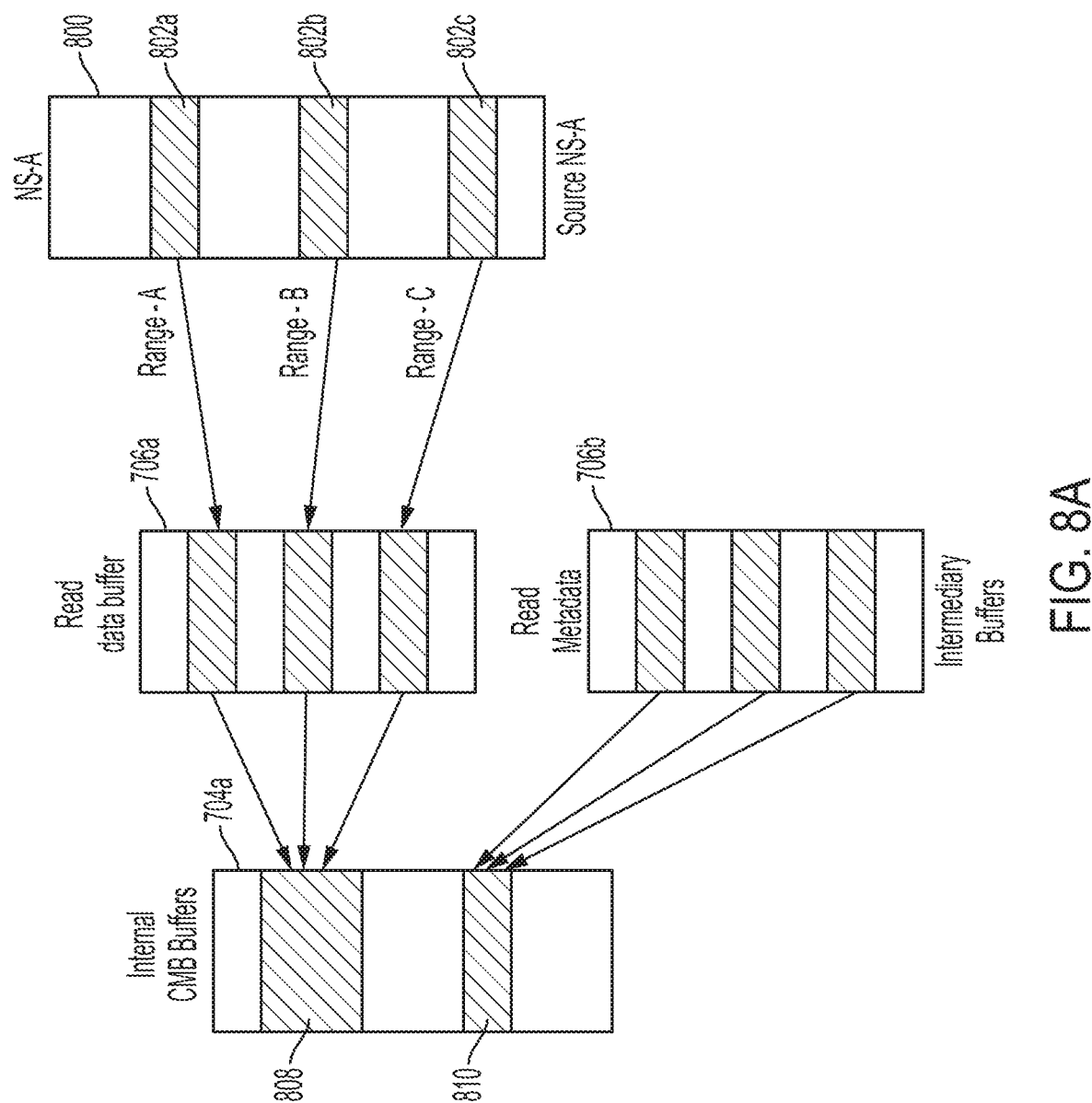
FIGS. 8A-8C are conceptual layout diagrams of various buffers invoked for copying data from a source namespace to a destination namespace according to one embodiment.
Figure 8B:
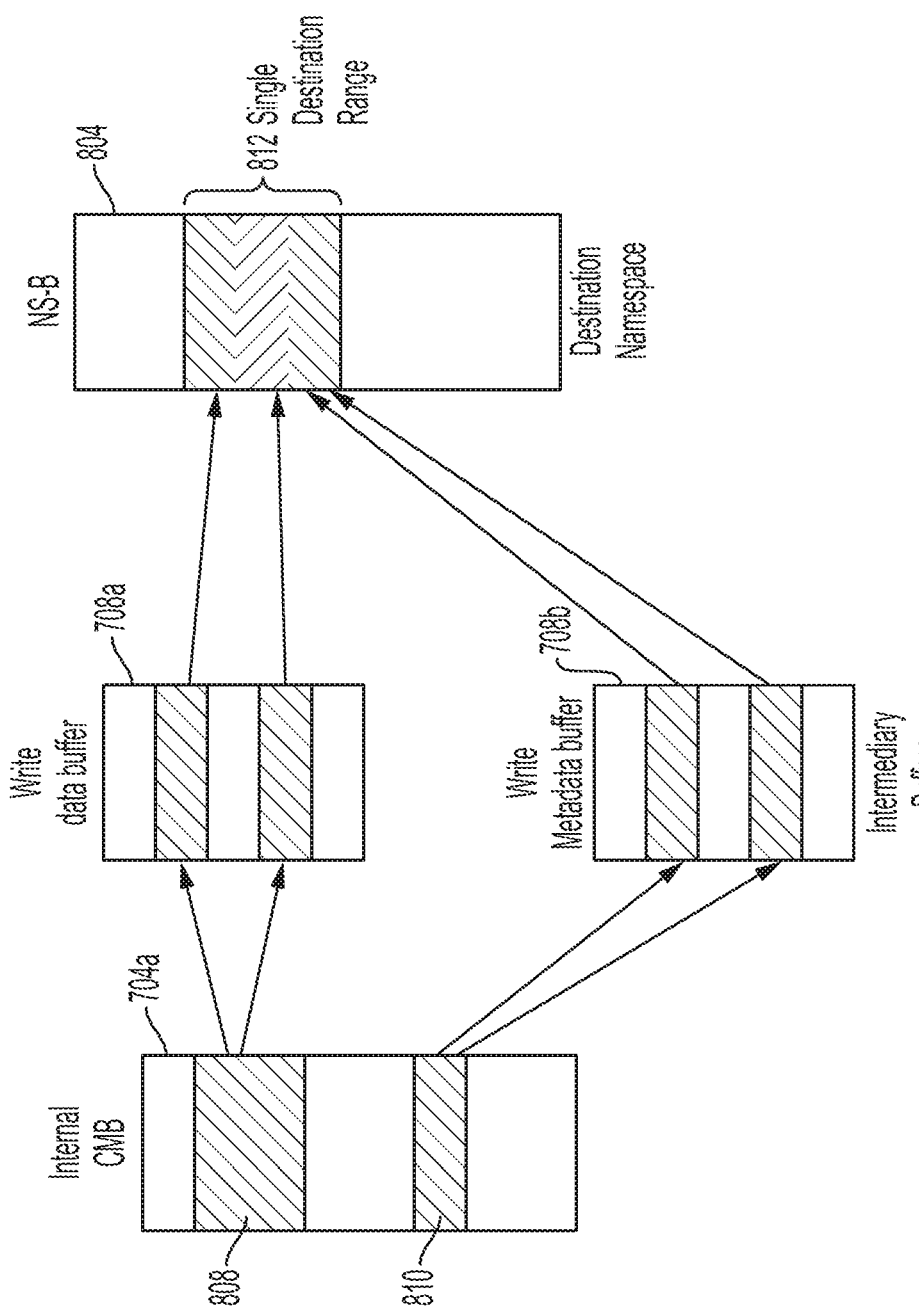
Figure 8C:
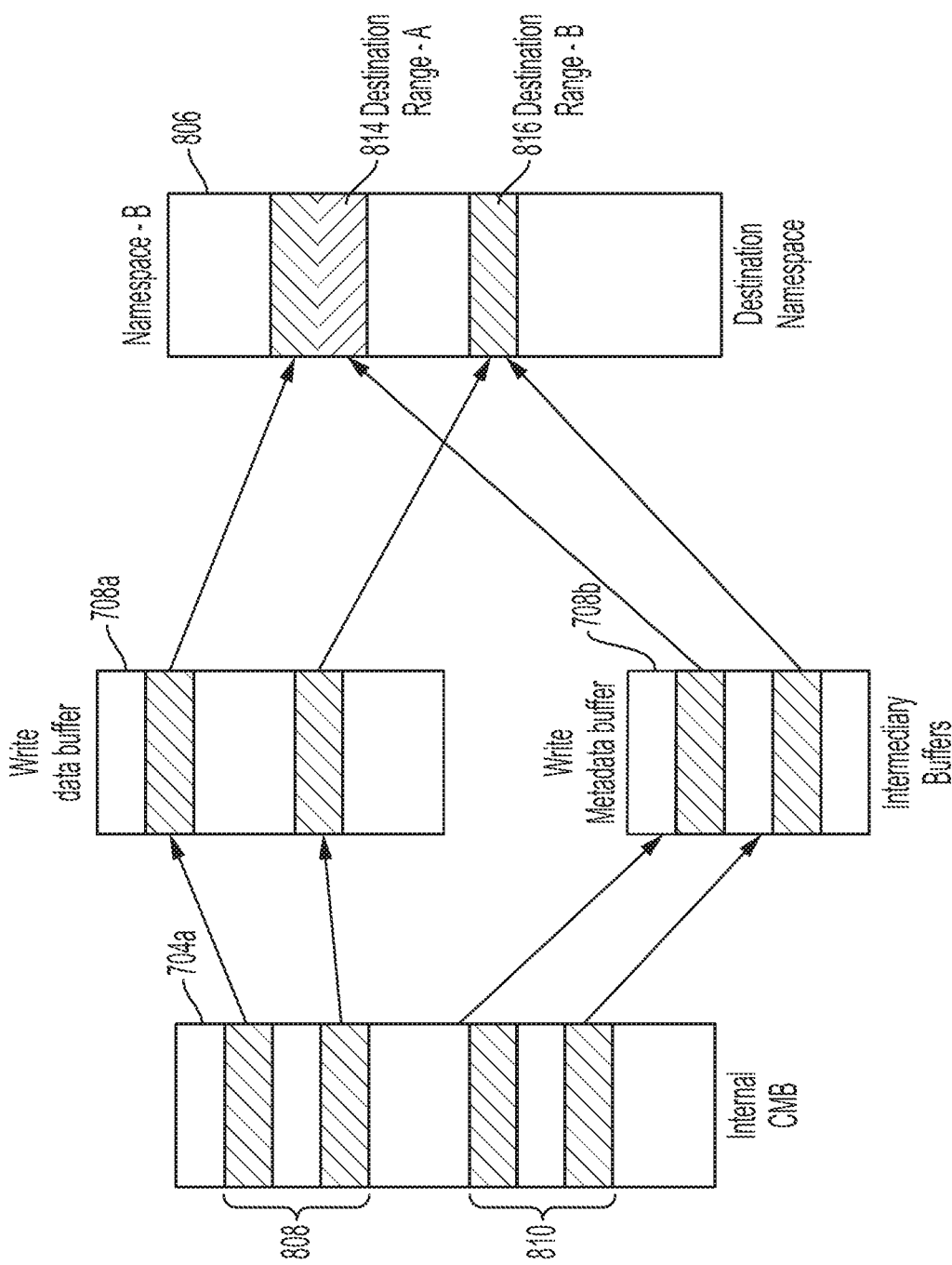

FIGS. 8A-8C are conceptual layout diagrams of various buffers invoked for copying data from a source namespace to a destination namespace according to one embodiment. The data in the source namespace 800 may be stored in multiple LBA ranges 802a-802c (collectively referenced as 802). In processing an internal read command to execute a read portion of the copy command, the flash DMA module 702 (FIG. 7) may execute a read transfer from the source LBA ranges 802, into intermediate read buffers (e.g. read data buffer 706a and read metadata buffer 706b). In this regard, as discussed with reference to FIG. 5, a logical block of data may have a data portion 502 and a metadata portion 504. In one embodiment, the flash DMA module 702 reads the data portion in the various source LBA ranges 802, and stores the data portion into the read data buffer 706a. The flash DMA module 702 may also read the metadata portions of the data, and store the metadata portions into the read metadata buffer 706b.

In completing the internal read command, the host DMA module 700 may transfer the data in the read data buffer 706a, and the metadata in the read metadata buffer 706b, into the internal CMB buffer 704a. The transferred data may be stored in a data section 808 of the internal CMB buffer 704a, and the transferred metadata may be stored in a metadata section 810 of the internal CMB buffer, but the embodiments are not limited thereto.

The read data may then be processed for writing into the destination LBA range(s). In the example of FIG. 8B, data is written to a single destination LBA range 812 in the destination namespace 804. In the example of FIG. 8C, data is written to multiple destination LBA ranges 814, 816. For both scenarios, the host DMA module 700 may transfer the data in the internal CMB buffer 704a, to the intermediate write buffers (e.g. write data buffer 708a and write metadata buffer 708b). For example, the host DMA module 700 may transfer the data section 808 to the write data buffer 708a, and the metadata section 810 to the write metadata buffer 708b. In the example of FIG. 8B, the flash DMA module 702 may then transfer the data along with the corresponding metadata in the write buffers 708a, 708b, to the single destination LBA range 812 in the destination namespace 804. In the example of FIG. 8C, the flash DMA module 702 may transfer the data along with the corresponding metadata in the write buffers 708a, 708b, to the multiple destination ranges 814, 816.

Figure 9A:
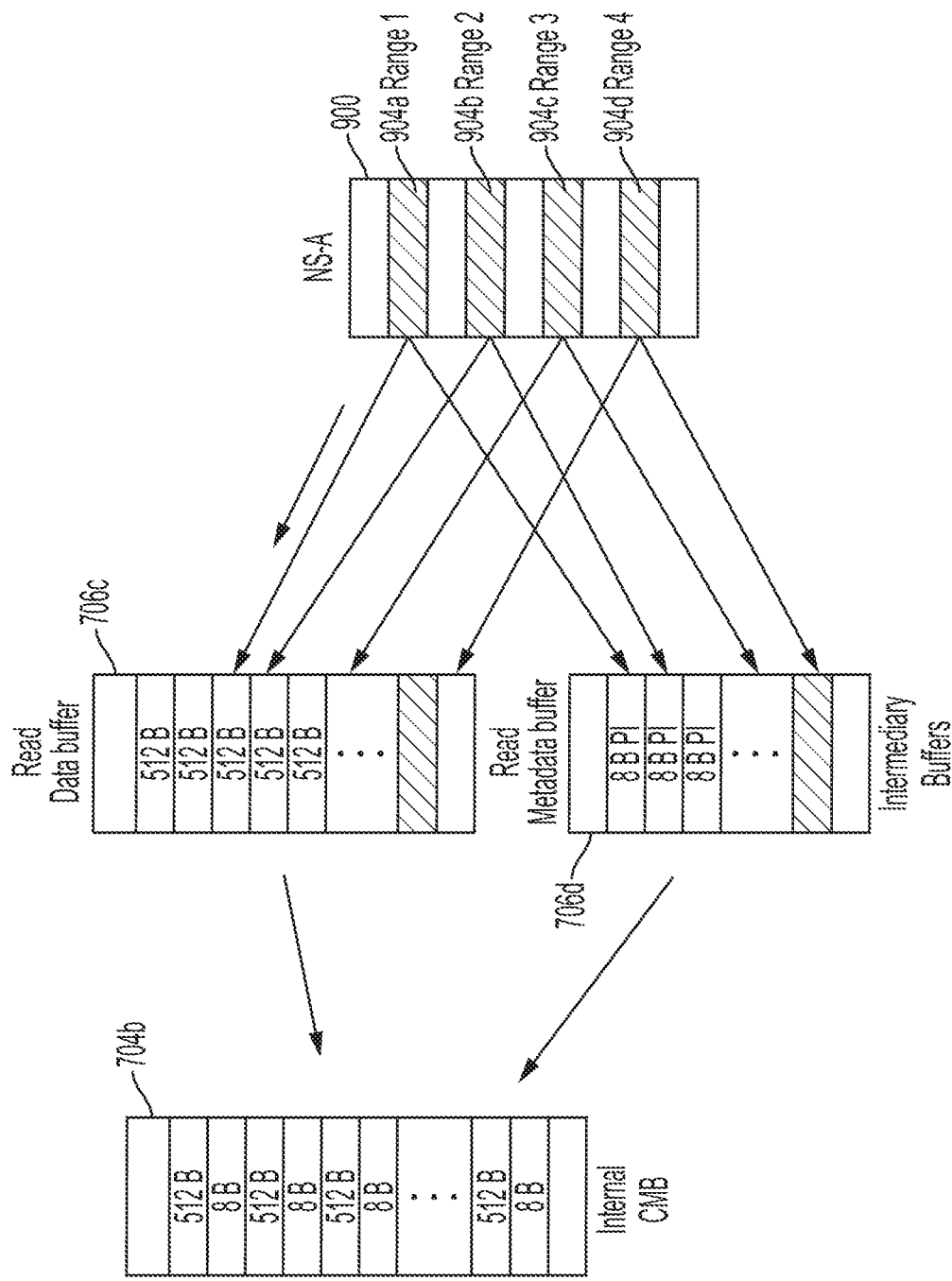
FIGS. 9A-9B are conceptual layout diagrams of various buffers invoked for copying data from multiple LBA ranges of a source namespace, to a single LBA range of a destination namespace, where both the source and destination namespaces have the same LBA format, according to one embodiment.
Figure 9B:
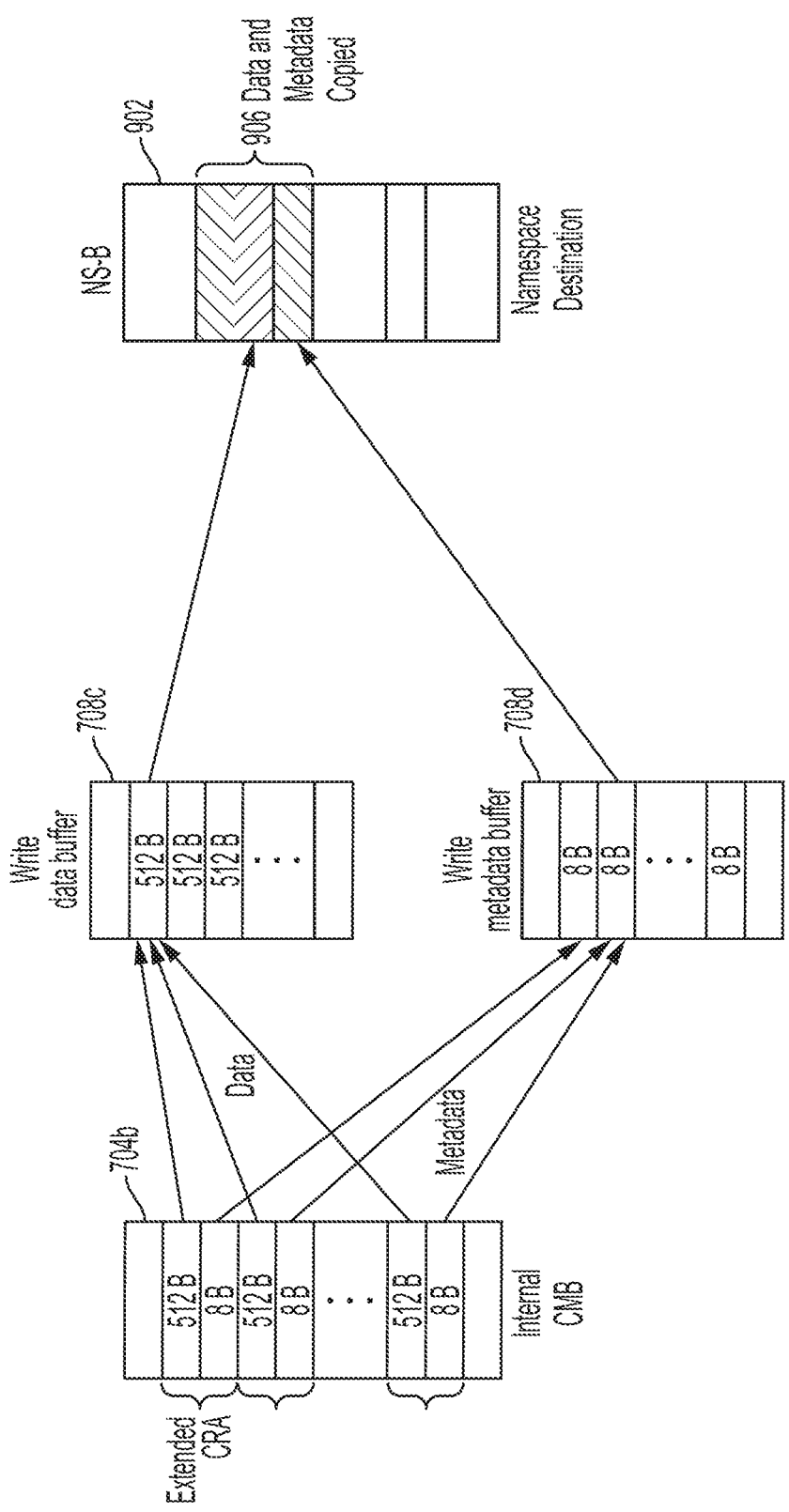

FIGS. 9A-9B are conceptual layout diagrams of various buffers invoked for copying data from multiple LBA ranges of a source namespace 900, to a single LBA range of a destination namespace 902, where both the source and destination namespaces have the same LBA format. For example, the logical block data size in the source and destination namespaces may be 512B, with each logical block having metadata that includes 8B of PI. FIGS. 9A-9B may also describe buffers that may be used to copy data from multiple LBA ranges of the source namespace 900, to multiple destination ranges, where both the source and destination ranges are formatted with the same LBA size.

In the example of FIGS. 9A-9B, four source LBA ranges 904a-904d (e.g. LBA 0-7, LBA 10-13, LBA 20-23, and LBA 28-43) are copied to a single destination LBA range 906 (e.g. LBA 0-31). In this regard, the data in the four source LBA ranges 904a-904d may be read and stored (e.g. 512B, 4K, 8K, 16 KB at a time) into an intermediate read data buffer 706c, and transferred to the internal CMB buffer 704b. The PI data corresponding to each logical block of data that is read may also be read and stored (e.g. 8B at a time) into an intermediate read metadata buffer 706d, and transferred to the internal CMB buffer.

In performing the write operation, the data in the CMB buffer 704b may be transferred to an intermediate write data buffer 708c. The metadata stored in the internal CMB buffer 704b may also be copied to the intermediate write metadata buffer 708d. In one embodiment, because the source and destination LBA formats in the example of FIGS. 9A-9B are the same, the PI portion of the metadata is not copied into the intermediate write metadata buffer 708d. The data and metadata in the write data buffers 708c, 708d may be transferred to the destination LBA range 906 for completing the copy operation. In one embodiment, the PI portion of the metadata, that was not copied, may be regenerated (e.g. by the host DMA module 700), and stored in the destination LBA range 906.

Figure 10A:
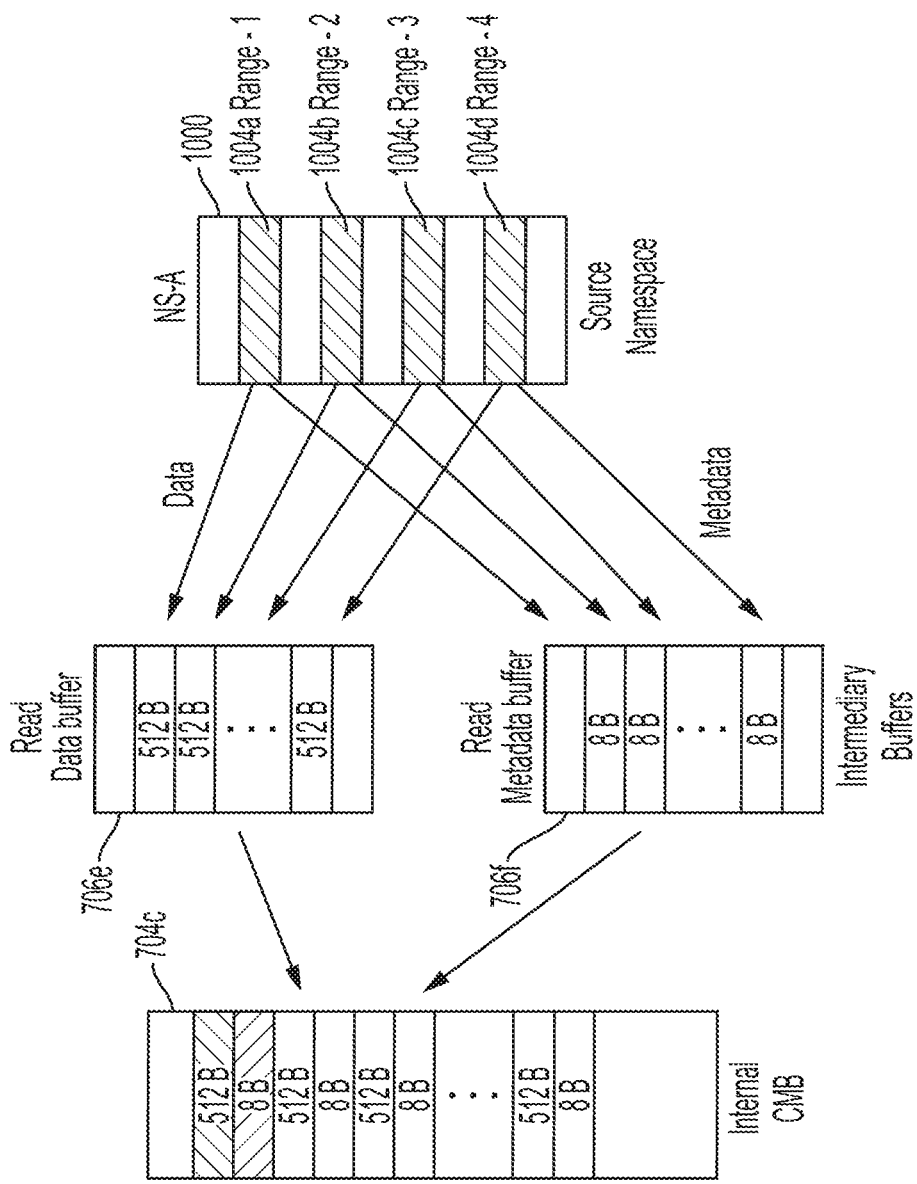
FIGS. 10A-10B are conceptual layout diagrams of various buffers invoked for copying data from multiple LBA ranges of a source namespace, to a plurality of LBA ranges of a destination namespace, where the source and destination namespaces have different LBA formats, according to one embodiment.
Figure 10B:
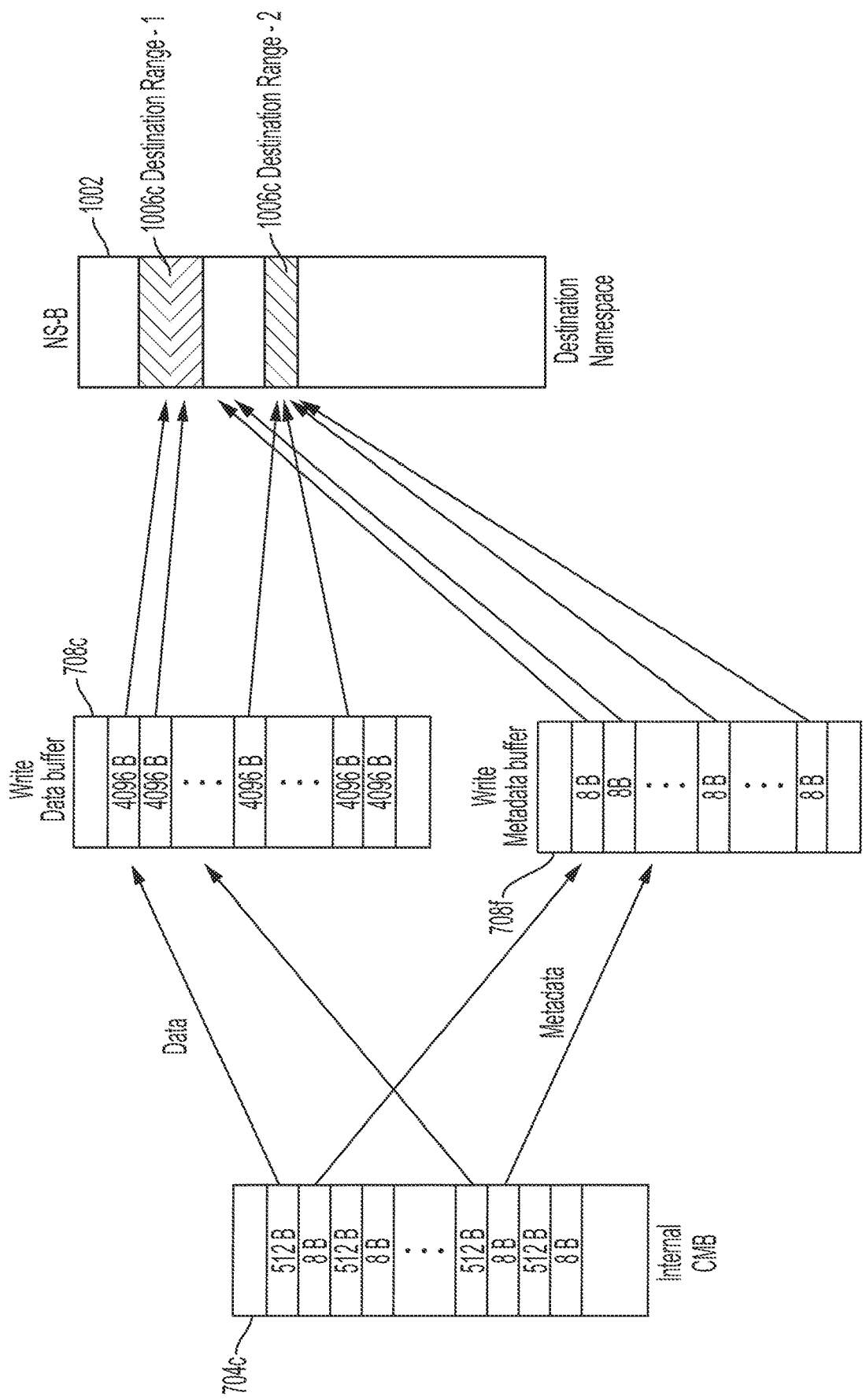

FIGS. 10A-10B are conceptual layout diagrams of various buffers invoked for copying data from multiple LBA ranges of a source namespace 1000, to a plurality of LBA ranges of a destination namespace 1002, where the source and destination namespaces have different LBA formats. For example, the logical block data size of the source namespace 1000 may be 512B, while the logical block data size of the destination namespace 1002 may be 4096B. In the example of FIGS. 10A-10B, four source LBA ranges 1004a-1004d (e.g. LBA 0-7, LBA 10-13, LBA 20-23, and LBA 28-43) are copied to two destination LBA ranges 1006a, 1006b (e.g. LBA 0-1 and LBA 4-5). FIGS. 10A-10B may also describe buffers that may be used to copy data from multiple LBA ranges of a source namespace 1000, to a single LBA range of a destination namespace 1002, where the source and destination namespaces are formatted with different LBA sizes.

In performing a read operation, the data in the various LBA ranges 1004a-1004d of the source namespace 1000 may be copied into the intermediary read data buffer 706e, and the corresponding metadata may be copied into the intermediary read metadata buffer 706f. The contents of the intermediary read data buffer 706e and the intermediary read metadata buffer 706f may then be transferred to the internal CMB buffer 704c.

In performing the write operation, the data in the internal CMB buffer 704c may be transferred to the intermediary write data buffer 708e, according to the LBA format of the destination namespace 1002. For example, 4096B of data from the internal CMB buffer 704c may be stored at a time in the intermediate write data buffer 708e. The metadata in the internal CMB buffer 704c may also be copied to the intermediate write metadata buffer 708f. The data and metadata in the write data buffers 708e, 708f may then transferred to the destination LBA ranges 1006a, 1006b. In one embodiment, because the source and destination namespaces in the example of FIGS. 10A-10B have different LBA formats, any PI portion of the metadata may be regenerated by the host DMA module 700, according to the PI formatting used by the destination namespace.

Figure 11A:
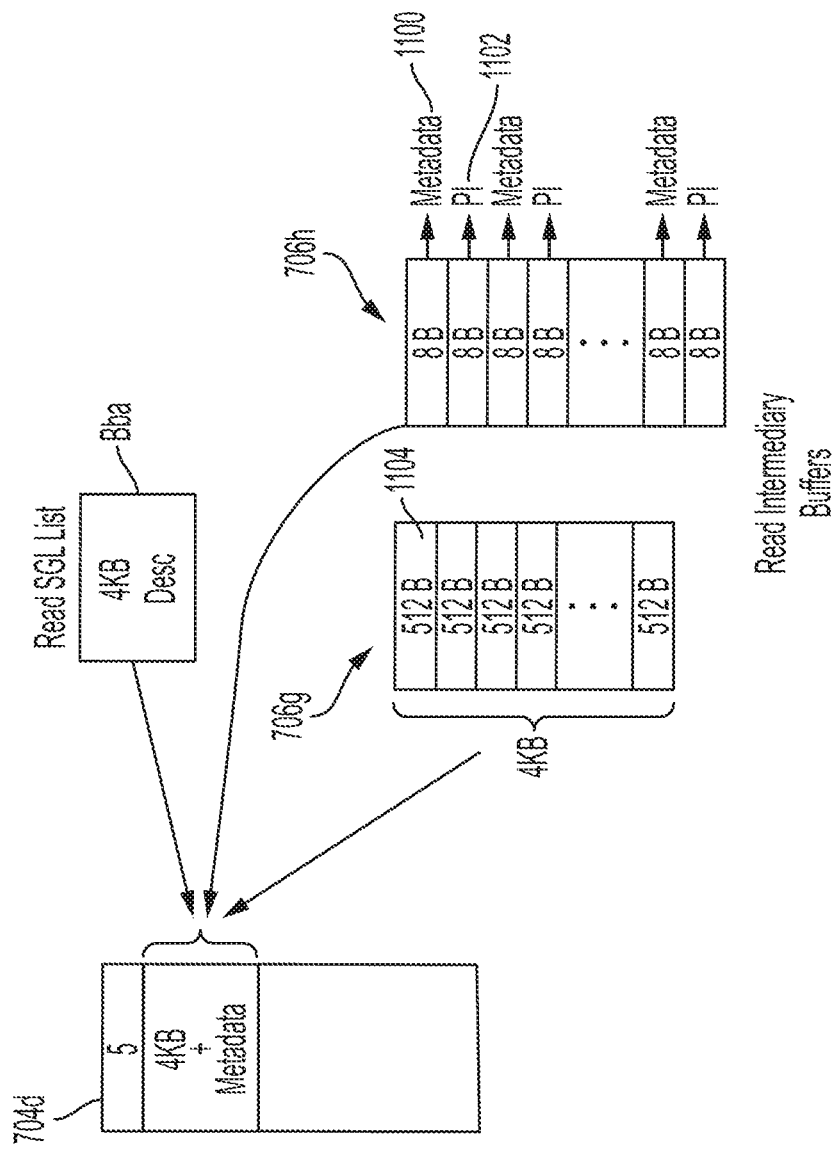
FIGS. 11A-11B are conceptual layout diagrams of buffers and SGL tables used for copying data in one source LBA range of one namespace, to a destination LBA range of another namespace, wherein the source and destination LBA ranges have a format similar to the format of the source and destination LBA ranges in FIGS. 10A-10B, according to one embodiment.
Figure 11B:
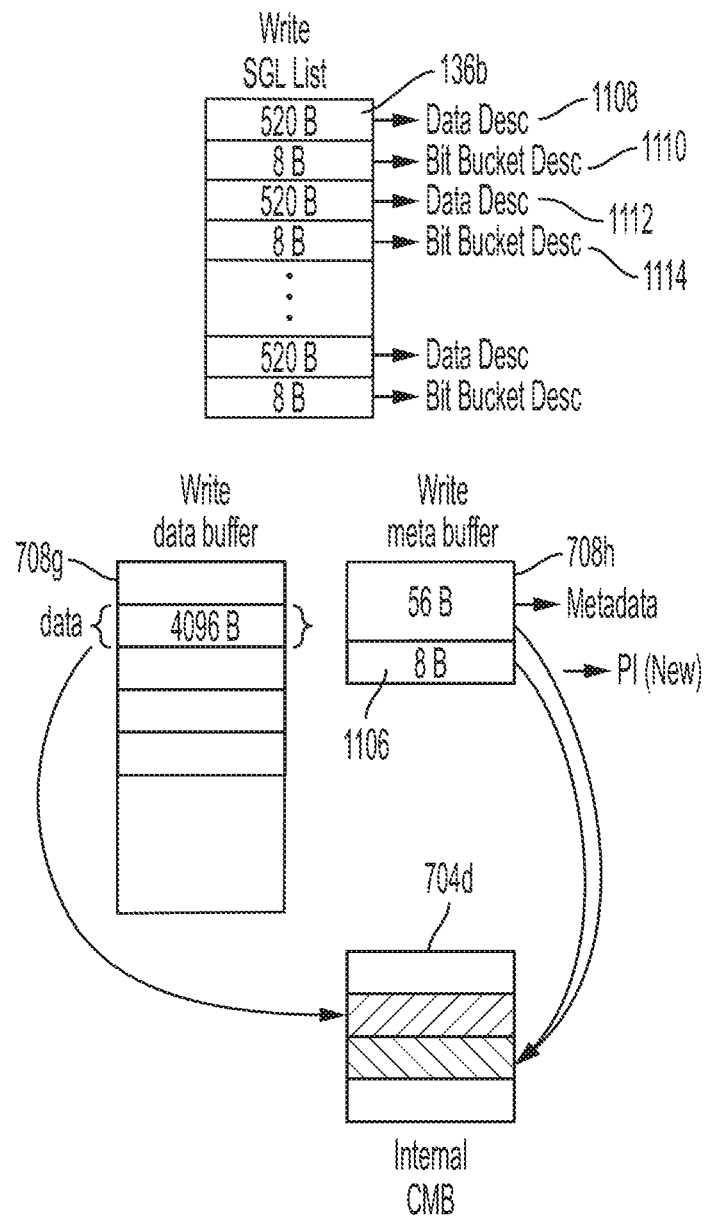

FIGS. 11A-11B are conceptual layout diagrams of buffers and SGL tables used for copying data in one source LBA range of one namespace, to a destination LBA range of another namespace, wherein the source and destination LBA ranges are the source and destination LBA ranges in FIGS. 10A-10B. It should be appreciated that similar SGL tables may be used for the buffers in the embodiment of FIGS. 9A-9B, where the LBA formats for the source and destination namespaces are the same.

In the examples of FIGS. 11A-11B, SGL bit bucket descriptors 1110 are used as described below, to skip the PI information of the read data, to allow the assembling of the read data and the associated metadata (including appropriate PI information) in a different LBA format in the destination namespace. The skipping of the PI information may be done while writing to the internal CMB buffer as part of a read operation, or it may be done while reading from the internal CMB buffer as part of a write operation. The regeneration of the PI may then be done by the host DMA module as per the destination LBA format.

In the example of FIGS. 11A-11B, eight logical blocks of data (each 512B) in the source namespace form a single destination logical block having a size of 4096B. The PI information (e.g. 8B PI information) that is associated with each 512B block of data is skipped using the bit bucket descriptor during the write portion of the process, and a single block of data having a size of 4096B may be formed in the destination namespace, with regenerated PI information (e.g. regenerated 8B of PI information).

More specifically, in executing an internal read operation, data (e.g. 4 KB of data) that is retrieved from the NVM media 144 and stored in an intermediary read data buffer 706g (similar to the process in FIGS. 10A-10B), may be transferred into an internal CMB buffer 704d. Metadata stored in an intermediary read metadata buffer 706h may also be transferred into the internal CMB buffer 704d. The internal CMB buffer 704d where the data and metadata are transferred may be described by one or more SGL/PRP entries 136a. In one embodiment, the SGL/PRP entries 136a are generated by the processor 140 based on the fetching and processing an internal read command. It should be appreciated that although the examples of FIGS. 8-10 do not expressly depict SGL/PRP entries, SGL/PRP entries may also be used in those examples to describe the internal CMB buffers 704a-704c.

In the example of FIGS. 11A-11B, the metadata in the intermediary read metadata buffer 706h may include a metadata portion 1100 and a PI portion 1102 for each logical block of data 1104 (e.g. 512B of data) in the intermediary read metadata buffer 706g. In executing the write portion of the copy command, the logical blocks of data 1104 and corresponding metadata portions 1100 that are transferred into the internal CMB buffer 704, may be written from the internal CMB buffer into respectively the intermediary write data buffer 708g and intermediary write metadata buffer 708h. In one embodiment, the data written into the intermediary write data buffer 708g follows the LBA format of the destination namespace. For example, each logical block of data in the intermediary write data buffer 708g may be 4096B in size.

The LBA formats of the source and destination namespaces in the example of FIGS. 11A-11B, are different. Accordingly, according to one embodiment, the PI portions 1102 of the read metadata are skipped, and not copied from the internal CMB 704d into the write metadata buffer 708h. In one embodiment, the skipped PI portion of the metadata is generated as PI 1106, by the host DMA module 700. The generated PI 1106 may be based on the PI formatting used by the destination namespace.

In one embodiment, information provided by the SGL/PRP entries 136b that are used for writing data to the intermediate write buffers 708g, 708h, allow the skipping of the PI portions 1102 of the read metadata in the internal CMB 704d. In one embodiment, the SGL/PRP entries 136b are generated by the processor 140 based on the fetching and processing an internal write command. In one embodiment, the processor 140 may determine that PI portions of the metadata to be written are to be skipped. Such determination may be based on determining that metadata read from the source namespace has the PI portion enabled, and further based on determining that the LBA format of the destination namespace differs from the LBA format of the source namespace.

In one embodiment, the SGL entries may include an SGL data descriptor 1108 for the data to be copied, including a descriptor for the block of data to be copied (e.g. 512B) and associated metadata (e.g. 8B of user data that excludes the PI portion). In one embodiment, an SGL bit bucket descriptor 1110 that follows the SGL data descriptor 1108 may be used for refraining from copying the PI portions of the metadata in the internal CMB 704d. For example, the SGL bit bucket descriptor may identify 8B of PI data that is to be skipped.

In one embodiment, the host DMA module 700 utilizes the SGL/PRP entries 136b for transferring data from the internal CMB buffer 704d, into the write data and metadata buffers 708g, 708h. In this regard, the host DMA module 700 may transfer the data in the CMB buffer described in the SGL data descriptor 1108 into the write data and metadata buffers 708g, 708h, and skip a portion of the data described in the SGL bit bucket descriptor 1110. The host DMA module 700 may continue in a similar manner, transferring data described in the remaining SGL data descriptors 1112, and skipping the data described in the remaining SGL bit bucket descriptors 1114. The PI portion of the metadata that is skipped may then be regenerated by the host DMA module 700 and stored in the metadata buffer 708h as per the destination namespace LBA format. In one embodiment, the regenerated PI is 8B in size, and is associated with 4096B of data in the destination namespace. In one embodiment, the 8B PI information 1106 may form the last 8B of the user data which, in the example of FIG. 11B, is 56B in size, and is copied from the source namespace.

In some embodiments, instead of including the SGL bit bucket descriptor in the SGL/PRP entries 136b for transferring data from the internal CMB buffer 704d, into the write data and metadata buffers 708g, 708h during the write process, the SGL bit bucket descriptor may be included in the SGL/PRP entries 136a used for the read process. According to this embodiment, a portion of the data described in the SGL bit bucket descriptor in the SGL/PRP entries are skipped, and not transferred from the intermediary read metadata buffer 706h into the internal CMB buffer 704d.

It should be appreciated that embodiments of the present disclosure allow processing of a copy command across different namespaces, even when the LBA formats between the namespaces differ, and/or even when different end-to-end protection information is used by the different namespaces. The use of SGL bit bucket descriptors to skip end-to-end protection information of the read data allows the assembling of the data and associated metadata (including protection information) in a different LBA format in the destination namespace. The regeneration of the PI may then be done by the host DMA module as per the destination LBA format.

It should be appreciated that the one or more processors discussed above may be include, for example, application specific integrated circuits (ASICs), general purpose or special purpose central processing units (CPUs), digital signal processors (DSPs), graphics processing units (GPUs), and/or programmable logic devices such as field programmable gate arrays (FPGAs). In a processor, as used herein, each function may be performed by hardware, firmware, and/or software. A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for processing copy commands have been specifically described and illustrated herein, many modifications and variations will be apparent to those skilled in the art. Accordingly, it is to be understood that a system and method for processing copy commands constructed according to principles of this disclosure may be embodied other than as specifically described herein. The disclosure is also defined in the following claims, and equivalents thereof.

What is claimed is:

1. A method for processing a copy command from a host to a storage device, the method comprising:
    receiving, by a first controller of the storage device, the copy command from the host via a first queue, wherein the copy command includes a first source address and a first destination address;
    generating, by the storage device, based on the copy command, a first read command;
    storing, by the storage device, the first read command in a second queue of the storage device;
    retrieving and processing, by a second controller of the storage device, the first read command from the second queue;
    reading, by the storage device, based on the processing of the first read command, data stored in a first location of a storage media of the storage device associated with the first source address, wherein the data read from the first location is stored in a first buffer in the storage device;
    generating, by the storage device, a first write command in response to the reading of the data;
    storing, by the storage device, the first write command in the second queue;
    identifying, by the storage device, an address for the data in the first buffer;
    writing, by the storage device, based on the processing of the first write command, the data to a second location of the storage media associated with the first destination address, wherein the processing of the first write command includes retrieving the data from the first buffer, based on the address, for writing to the second location of the storage media; and
    transmitting, by the first controller, a signal to the host for indicating completion of the copy command.

2. The method of claim 1, wherein the first source address is associated with a first logical space of the storage device identified by a first identifier, and the first destination address is associated with a second logical space of the storage device identified by a second identifier.

3. The method of claim 1, wherein the copy command includes a second destination address, wherein the writing includes writing a first portion of the data to the second location of the storage media associated with the first destination address, and writing a second portion of the data to a third location of the storage media associated with the second destination address.

4. The method of claim 1, wherein the data stored in the first location of the storage media is associated with metadata having a first portion and a second portion, wherein the writing of the data includes:

writing the first portion of the metadata to a third location of the storage media associated with the first destination address;

generating, by the storage device, a third portion associated with the second portion of the metadata based on the first destination address; and writing, by the storage device, the third portion in the storage media instead of the second portion of the metadata.

5. The method of claim 4 further comprising:
skipping reading of the second portion of the metadata based on the processing of the first read command.

6. The method of claim 4 further comprising:
skipping writing of the second portion of the metadata based on the processing of the first write command.

7. The method of claim 4, wherein the second portion of the metadata includes data protection information.

8. The method of claim 4, wherein the first source address is associated with a first logical space configured to store a block of data of a first size, and the first destination address is associated with a second logical space configured to store a block of data of a second size different from the first size.

9. The method of claim 1, wherein the copy command is associated with a second source address, the method further comprising:

generating, by the storage device, based on the copy command, a second read command;

submitting, by the storage device, the second read command to the second controller of the storage device via the second queue;

retrieving and processing, by the second controller, the second read command from the second queue; and reading, by the storage device, based on the processing of the second read command, data stored in a third location of the storage device associated with the second source address, wherein the processing of the second read command by the second controller is concurrent with the processing of the first write command.

10. The method of claim 1 wherein the storage device is a non-volatile storage device, and the first controller and the second controller adhere to a non-volatile memory express (NVMe) protocol.

11. The method of claim 1 further comprising:
submitting, by the second controller, a first completion status to a first completion queue.

12. The method of claim 11, wherein the transmitting of the signal includes submitting a second completion status to a second completion queue based on the submitting of the first completion status to the first completion queue.

13. A storage device comprising:
a storage media;
a first buffer;
one or more processors coupled to the storage media and the first buffer, the one or more processors being configured to respectively:
receive, via a first controller and a first queue, a copy command from a host, wherein the copy command includes a first source address and a first destination address;
generate, based on the copy command, a first read command;
store the first read command a second queue;
retrieve and process, via a second controller, the first read command from the second queue;
read, based on processing of the first read command, data stored in a first location of the storage media associated with the first source address, wherein the data read from the first location is stored in the first buffer;
generate a first write command in response to the reading of the data;
store the first write command in the second queue;
identify an address for the data in the first buffer;
write, based on processing of the first write command, the data to a second location of the storage media associated with the first destination address, wherein in processing the first write command, the processor is configured to retrieve the data from the first buffer, based on the address, for writing to the second location of the storage media; and
transmit, via the first controller, a signal to the host for indicating completion of the copy command.

14. The storage device of claim 13, wherein the first source address is associated with a first logical space of the storage device identified by a first identifier, and the first destination address is associated with a second logical space of the storage device identified by a second identifier.

15. The storage device of claim 13, wherein the copy command includes a second destination address, wherein in writing the data, the one or more processors are configured to write a first portion of the data to the second location of the storage media associated with the first destination address, and write a second portion of the data to a third location of the storage media associated with the second destination address.

16. The storage device of claim 13, wherein the data stored in the first location of the storage media is associated with metadata having a first portion and a second portion, wherein in writing the data, the one or more processors are further configured to:
write the first portion of the metadata to a third location of the storage media associated with the first destination address;
generate a third portion associated with the second portion of the metadata based on the first destination address; and
write the third portion in the storage media instead of the second portion of the metadata.

17. The storage device of claim 16, wherein the one or more processors are further configured to:
skip reading of the second portion of the metadata based on the processing of the first read command.

18. The storage device of claim 16, wherein the one or more processors are further configured to:
skip writing of the second portion of the metadata based on the processing of the first write command.

19. The storage device of claim 16, wherein the second portion of the metadata includes data protection information.

20. The storage device of claim 16, wherein the first source address is associated with a first logical space configured to store a block of data of a first size, and the first destination address is associated with a second logical space configured to store a block of data of a second size different from the first size.

* * * * *